(12) United States Patent
Krull et al.

(10) Patent No.: US 11,993,756 B2
(45) Date of Patent: *May 28, 2024

(54) COMPOSITIONS AND METHODS OF DISPERGATING PARAFFINS IN SULPHUR-LOW FUEL OILS

(71) Applicant: Clariant International Ltd., Muttenz (CH)

(72) Inventors: Matthias Krull, Harxheim (DE); Kerstin Müller, Mainz (DE); Simone Hackländer, Solingen (DE); Oliver Hubert, Düsseldorf (DE); Sergey Burmistrov, Moscow (RU); Lydmila Abramova, Perm (RU); Alexander Utkin, Krasnogorsk (RU)

(73) Assignee: Clariant International Ltd, Muttenz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/913,755

(22) PCT Filed: Jan. 15, 2021

(86) PCT No.: PCT/EP2021/050783
§ 371 (c)(1),
(2) Date: Sep. 22, 2022

(87) PCT Pub. No.: WO2021/190793
PCT Pub. Date: Sep. 30, 2021

(65) Prior Publication Data
US 2023/0340351 A1    Oct. 26, 2023

(30) Foreign Application Priority Data
Mar. 24, 2020   (EP) ..................................... 20165086

(51) Int. Cl.
| | | |
|---|---|---|
| *C10L 10/08* | (2006.01) | |
| *C10L 1/14* | (2006.01) | |
| *C10L 1/22* | (2006.01) | |
| *C10L 1/222* | (2006.01) | |
| *C10L 1/224* | (2006.01) | |

(52) U.S. Cl.
CPC .............. *C10L 10/08* (2013.01); *C10L 1/146* (2013.01); *C10L 1/2222* (2013.01); *C10L 1/224* (2013.01); *C10L 2200/0438* (2013.01); *C10L 2200/0446* (2013.01)

(58) Field of Classification Search
CPC ........ C10L 10/08; C10L 1/146; C10L 1/2222; C10L 1/224; C10L 2200/0438; C10L 2200/0446; C10L 1/1881; C10L 1/1888; C10L 1/191; C10L 1/1963; C10L 1/1966; C10L 1/1973; C10L 1/1981; C10L 1/1985; C10L 10/14
See application file for complete search history.

(56) References Cited

U.S. PATENT DOCUMENTS

| | | | | |
|---|---|---|---|---|
| 7,323,019 B2 * | 1/2008 | Krull | ....................... | C10L 1/143 44/418 |
| 7,347,881 B2 * | 3/2008 | Krull | ...................... | C10L 1/143 44/388 |
| 7,377,949 B2 * | 5/2008 | Krull | ...................... | C10L 1/143 44/418 |
| 8,287,608 B2 | 10/2012 | Schwab | | |
| 2017/0233670 A1 * | 8/2017 | Feustel | ..................... | C10L 1/10 44/351 |

FOREIGN PATENT DOCUMENTS

| | | |
|---|---|---|
| DE | 2557793 A1 | 7/1976 |
| EP | 0061894 | 10/1982 |
| EP | 0154177 | 9/1985 |
| EP | 0283293 | 9/1988 |
| EP | 0413279 | 2/1991 |
| EP | 0436151 | 7/1991 |
| EP | 0597278 | 5/1994 |
| EP | 0606055 | 7/1994 |
| EP | 0688796 | 12/1995 |
| EP | 0777712 | 6/1997 |
| WO | 2008113757 A1 | 9/2008 |

OTHER PUBLICATIONS

International Search Report issued in App. No. PCT/EP2021/050783, dated Mar. 30, 2021, 4 pages.

* cited by examiner

*Primary Examiner* — Ellen M McAvoy

(57) ABSTRACT

The present invention relates to a low-temperature additive for fuel oils having a sulfur content of less than 50 ppm, comprising
i) at least one oil-soluble amide-ammonium salt of a polycarboxylic acid with a mono- and/or dialkylamine (A) and
ii) 5-100% by weight, based on the amount of amide-ammonium salt (A), of an oil-soluble amine (B), and
iii) 0.1 to 10 parts by weight, based on the amount of amide-ammonium salt (A), of a resin formed from at least one aromatic compound bearing an alkyl radical and an aldehyde and/or ketone (D).

33 Claims, No Drawings

COMPOSITIONS AND METHODS OF DISPERGATING PARAFFINS IN SULPHUR-LOW FUEL OILS

Mineral oils and mineral oil distillates, such as gas oil, diesel fuel for heating oil, generally contain a proportion of dissolved n-paraffins. At low temperatures, solid paraffins precipitate out at the cloud point ("CP"). In the course of further cooling, the platelet-shaped n-paraffin crystals form a kind of "house-of-cards structure" that causes the mineral oil or mineral oil distillate to cease to flow, even though it is still predominantly liquid. As a result of the precipitated n-paraffins in the temperature range between the cloud point and pour point ("PP"), flowability of middle distillate fuels in particular is considerably impaired; the paraffins block filters and cause inhomogeneous or complete stoppage of supply of fuel to the combustion units. Similar disruption occurs in the case of light heating oils.

In view of decreasing global oil reserves and the discussion of the consequences of the consumption of fossil and mineral fuels that affect the environment, there is rising interest in the additional use of alternative energy sources based on renewable raw materials (biofuels). In addition to conventional fatty acid esters as first-generation biodiesel, various methods of producing synthetic fuels have been developed in the last few years. These can be used to produce virtually aromatics-free paraffinic hydrocarbons, especially from waste fat and residue material fractions from the foods industry, from fisheries and slaughterhouses and from other vegetable oil fractions not intended for the foods industry. Such synthetic fuels include, for example, hydrotreated vegetable oils (HVOs), which can be produced by hydrodeoxygenation of vegetable oils, optionally followed by isomerization of the crude products. A further example is synthetic fuels produced by means of Fischer-Tropsch synthesis. The constituents of these second-generation biofuels are very similar to conventional middle distillate constituents based on fossil raw materials and can therefore replace middle distillates based on fossil raw materials in virtually any mixing ratio—irrespective of the specific fuel quality.

As is the case for fuel oils of fossil origin, paraffin crystals precipitate out in the course of cooling of such synthetic fuels, which can likewise block motor vehicle filters and metering devices. On account of their high proportion of paraffinic constituents, the abovementioned synthetic fuels, and also mixtures thereof with middle distillates of mineral or fossil origin, generally have poorer low-temperature characteristics than middle distillates of fossil origin alone. In the context of this invention, middle distillates of mineral and fossil origin, second-generation biofuels and mixtures thereof are referred to collectively as fuel oil.

Apart from the conventional methods of eliminating paraffin problems (thermal, mechanical or with solvents) that relate merely to the removal of the precipitates already formed, a number of chemical additives (paraffin inhibitors) have been developed, which, by virtue of physical interaction with the precipitating paraffin crystals, result in modification of the shape, size and adhesion properties thereof. Useful paraffin inhibitors or cold improvers/middle distillate flow improvers ("MDFIs") of this kind have especially been found to be polymers having paraffinlike structural elements, for example copolymers of ethylene with vinyl esters and/or acrylic esters and especially ethylene-vinyl acetate polymers ("EVA") and the combination thereof with comb polymers having long alkyl side chains. These additives act as additional crystal seeds and partly crystallize out with the paraffins. This forms fine separate crystals which, even when the temperature is lowered further, pass through filters in motor vehicles and heating systems or at least form a filtercake which is permeable to liquid portion of the fuel oils, such that undisrupted operation is ensured. Fuel oils with added additives can still be pumped and processed at temperatures that are often more than 20° C. lower than in the case of unadditized oils. The efficacy of the paraffin inhibitors is typically expressed, according to European standard EN 116, indirectly via measurement of the cold filter plugging point ("CFPP") of additized oils.

One disadvantage of these cold flow improvers is that the paraffin crystals modified thereby, on account of their higher density compared to the liquid portion of the fuel oil, settle out to an ever greater degree at the base of the vessel in the course of storage of the fuel. This results in formation of a homogeneous low-paraffin phase in the upper part of the vessel and of a biphasic paraffin-rich layer at the base. Since, both in vehicle tanks and in storage or supply tanks, fuel is usually drawn off a little way above the base of the vessel, there is the risk that the high concentration of solid paraffins will lead to blockage of filters and metering devices. This risk increases with the extent to which the storage temperature goes below the precipitation temperature of the paraffins, since the amount of paraffin precipitated increases with falling temperature.

The additional use of paraffin dispersants or wax antisettling additives ("WASAs") can reduce the problems outlined. Various paraffin dispersants both of monomeric and polymeric structure are known.

Examples of known monomeric paraffin dispersants include reaction products of alkenylspirobislactones with amines, which are known from EP-A-0413279.

Moreover, EP-A-0061894 discloses oil-soluble nitrogen compounds, for example reaction products of phthalic anhydride with amines, which are used in a mixture with ethylene-vinyl acetate polymers.

Furthermore, EP-A-0597278 discloses reaction products of aminoalkylenecarboxylic acids with primary or secondary amines.

EP-A-0436151 discloses mineral oil middle distillates having improved low-temperature properties which comprise reaction product of copolymers based on maleic anhydride and α,β-unsaturated compounds with dialkanolamines.

EP-A-0283293 discloses copolymers based on aliphatic olefins and maleic anhydride, wherein the copolymer must have both ester groups and amide groups, each of which contains an alkyl group having at least 10 carbon atoms. In addition, it discloses copolymers that are obtained by reaction of a secondary amine with a polymer containing anhydride groups, with formation of amide and ammonium salts in equal portions from the anhydride groups.

EP-A-0606055 discloses terpolymers based on α,β-unsaturated dicarboxylic anhydrides, α,β-unsaturated compounds and polyoxyalkylene ethers of lower unsaturated alcohols, and the use thereof as paraffin inhibitors for paraffinic crude oil products. Furthermore, EP-A-0688796 discloses copolymers based on α,β-unsaturated olefins having at least three carbon atoms and α,β-unsaturated dicarboxylic anhydrides, wherein the dicarboxylic anhydride units are converted to imide, amide or ammonium units by polymer-analogous reaction with polyetheramines or alkanolamines.

WO 2008/113757 discloses a mixture comprising
(a) 5% to 95% by weight of at least one organic compound capable of improving the low-temperature flow characteristics of fuels, and
(b) 5% to 95% by weight of at least one amine of the general formula I $$R^1R^2HN \quad (I)$$

in which $R^1$ is a hydrocarbyl radical which has 6 to 40 carbon atoms and may also contain further primary and/or secondary and/or tertiary amine functions, and $R^2$ denotes a hydrocarbyl radical having 6 to 40 carbon atoms of hydrogen, where $R^1$ and $R^2$ together may also form a 5- to 7-membered ring, where the sum total of components (a) and (b) is 100% by weight.

DE-2557793 discloses a middle distillate fuel composition having improved low-temperature flow properties, comprising
(1) between about 0.005% and 0.10% by weight (based on the weight of the overall fuel composition) of a dialkyl-substituted secondary amine in which each alkyl group is linear and has between 8 and 30 carbon atoms,
(2) between about 0.003% and 0.20% by weight of a pour point depressant and
(3) between about 0.025% and 0.50% of an amorphous petrolatum having a melting point in the range from about 25 to 60° C. and a numerical average molecular weight in the range from about 600 to 1100, which is essentially free of normal paraffins,
in which the pour point depressant consists of
(A) an oil-soluble ethylene copolymer having a numerical average molecular weight in the range from about 1000 to 50 000, which is a copolymer of 3 to 40 molar parts of ethylene and 1 molar part of a comonomer, namely a $C_3$-$C_{16}$-α-monoolefin or an unsaturated ester of the following formula:

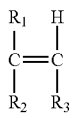

in which
$R_1$ is hydrogen or a methyl radical,
$R_2$ is a —$OOCR_4$ or —$COOR_4$, in which $R_4$ is hydrogen or an alkyl group having 1 to 16 carbon atoms, and $R3$ is hydrogen or the —$COOR_4$ radical; or
(B) chlorinated polyethylene having a numerical average molecular weight of 1000 to 20 000 and a chlorine content of 4% to 35% by weight; or
(C) a hydrocarbyl-substituted succinamic acid derivative of the formula:

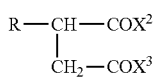

in which
R is a straight-chain aliphatic hydrocarbyl radical which has 0 or 1 olefinic unsaturation and 14 to 40 carbon atoms and is bonded to the succinyl group at a secondary carbon atom, one of the two $X^2$ and $X^3$ radicals is —$NYY^1$ in which $YY^1$ denotes aliphatic hydrocarbyl groups having 14 to 40 carbon atoms and the other of the $X^2$ and $X^3$ radicals denotes a radical of the formula:

—$OH(NHY^2Y^3)_n$ in which
n is 0 or 1, $Y^2$ and $Y^3$ are hydrogen or aliphatic or oxyaliphatic hydrocarbons having 1 to 30 carbon atoms or, together with the nitrogen to which they are bonded, are a heterocyclic ring having 5 to 7 members, or
(D) a hydrogenated copolymer of butadiene and styrene.

U.S. Pat. No. 8,287,608 teaches a composition comprising a mixture of at least one amine having at least one alicyclic group and at least one monocarboxylic acid or fatty acid having between eight and 22 carbon atoms. The composition relates to the technical problem that commercially available fatty acids and fatty acid mixtures have a tendency to freeze or form crystals at customary temperatures in winter weather. The freezing or formation of crystals makes it difficult to handle the additives, and especially to inject them into the fuel. There is therefore a need for an improvement in the lubricant additives in order to lead to lowering of the cloud point of the lubricant additives themselves without having detrimental effects on other desired properties.

In view of ever-increasing demands on the environmental compatibility of fuels and their combustion products, the sulfur content of middle distillate has been lowered stepwise since the 1990s and is currently limited to a maximum of 10 ppm in most regions. However, the refinery processes employed for desulfurization of fuel oils of fossil origin lower not only the level of unwanted sulfur compounds but also the content of further components, for example polycyclic aromatics and other polar compounds that are required for the location of engine parts, for example the injection pump. Consequently, it is necessary to add what is called a lubricity additive to low-sulfur fuels for assurance of sufficient lubricity. This typically comprises fatty acids, esters thereof, for example polyol partial esters, and/or amide thereof, for example alkanolamides. Since the second-generation biofuels, as a result of the synthesis, contain virtually no polar components capable of lubrication, the need for lubricity additives is particularly high in fuels containing or consisting of a second-generation biofuel.

It is often the case, however, that the addition of a lubricity additive to the fuel oil leads to impairment of the efficacy of paraffin dispersants containing, as active ingredient, an amide-ammonium salt of a polycarboxylic acid. This is manifested, for example, in that the low-temperature properties established with such paraffin dispersants are worsened by the lubricity additive, or the low-temperature properties that can be established with the paraffin dispersant are not attained. This antagonism is observed especially when paraffin dispersion is to be ensured under very critical conditions, for example in the case of storage of the fuel oil at temperatures of not just 5 K as usual, but of 10 K and more, for example 15 K, below the cloud point of the fuel oil and/or over prolonged periods of several days to weeks. Increasing the dosage rate of the paraffin dispersant can generally only partly overcome this antagonistic effect, if at all.

It was thus an object of the present invention to provide a paraffin dispersant improved over the prior art, the efficacy of which is not impaired by the addition of a lubricity additive selected from fatty acids, fatty acid partial esters of polyols and/or fatty acid amides of alkanolamides to the fuel oil comprising the paraffin dispersant.

It was a further object of the invention to improve the response characteristics of paraffin dispersants in such low-sulfur fuel oils comprising a lubricity additive selected from fatty acids, fatty acid partial esters of polyols and/or fatty acid amides of alkanolamides. Improvement in response characteristics is understood here to mean that the improvement in low-temperature properties achievable at a given dosage rate of the paraffin dispersant is comparable or even improved in the absence or in the presence of a lubricity additive in the fuel oil. Comparable efficacy is understood to mean that the low-temperature properties in their entirety comes close as possible to the values without the addition of lubricity additive.

The present invention further provides a fuel oil which, by virtue of addition of a paraffin dispersant and of a lubricity additive selected from fatty acids, fatty acid partial esters of polyols and/or fatty acid amides of alkanolamides, has the same or at least comparable low-temperature properties to the same fuel oil after addition of the paraffin dispersant alone.

It has now been found that, surprisingly, the efficacy of a paraffin dispersant comprising not only the oil-soluble amide-ammonium salt of a polycarboxylic acid but also an oil-soluble amine is not impaired by the addition of a lubricity additive to the fuel oil comprising the paraffin dispersant and the oil-soluble amine. Equally, the response characteristics of a paraffin dispersant comprising an amide-ammonium salt of a polycarboxylic acid that have been impaired by the presence of a lubricity additive in the fuel oil can be improved by addition of an oil-soluble amine to the paraffin dispersant. Furthermore, the antagonistic effect of a lubricity additive on the efficacy or response characteristics of a paraffin dispersant comprising an amide-ammonium salt of a polycarboxylic acid can be suppressed by adding an oil-soluble amine to the fuel oil.

The present invention thus firstly provides a low-temperature additive for fuel oils having a sulfur content of less than 50 ppm, comprising
at least one oil-soluble amide-ammonium salt of a polycarboxylic acid with a
i) mono- and/or dialkylamine (A) and
ii) 5-100% by weight, based on the amount of amide-ammonium salt (A), of an oil-soluble amine (B), and
iii) 0.1 to 10 parts by weight, based on the amount of amide-ammonium salt (A), of a resin formed from at least one aromatic compound bearing an alkyl radical and an aldehyde and/or ketone (D).

The invention secondly provides for the use of a low-temperature additive according to the first subject of the invention for improving the low-temperature properties of a fuel oil having a sulfur content of less than 50 ppm, comprising a lubricity additive (C).

The invention thirdly provides for the use of 5-100% by weight, based on the amount of amide ammonium salt (A), of an oil-soluble amine (B) for improving the low-temperature properties of a fuel oil having a sulfur content of less than 50 ppm, comprising
i) at least one oil-soluble amide-ammonium salt of a polycarboxylic acid with a mono- and/or dialkylamine (A) and
ii) a lubricity additive (C), and
iii) 0.1 to 10 parts by weight, based on the amount of amide-ammonium salt (A), of a resin formed from at least one aromatic compound bearing an alkyl radical and an aldehyde and/or ketone (D).

The invention fourthly provides a method of improving the response characteristics of a fuel oil having a sulfur content of less than 50 ppm to the addition of an amide-ammonium salt (A) as low-temperature additive, wherein the fuel oil comprises a lubricity additive (E) and a resin formed from aromatic compounds bearing at least one alkyl radical and aldehydes and/or ketones (D), wherein 5% to 100% by weight of an oil-soluble amine (B) is added to the fuel oil, based on the amide-ammonium salt (A).

The present invention fifthly provides fuel oils having a sulfur content of less than 50 ppm, comprising
i) at least one oil-soluble amide-ammonium salt of a polycarboxylic acid with a mono- and/or dialkylamine (A),
ii) 5-100% by weight, based on the amount of amide-ammonium salt (A), of an oil-soluble amine (B) and
ii) a lubricity additive (C), and
iv) 0.1 to 10 parts by weight, based on the amount of amide-ammonium salt (A), of a resin formed from at least one aromatic compound bearing an alkyl radical and an aldehyde and/or ketone (D).

The combination of (A), (B) and (D) is also referred to hereinafter as "additive of the invention" or "low-temperature additive of the invention". The oil-soluble amide-ammonium salt of a polycarboxylic acid with a mono- and/or dialkylamine (A) is also referred to in the context of this invention as amide-ammonium salt (A).

What is meant in accordance with the invention by improvement in the response characteristics of low-temperature additives is that at least one low-temperature property of a fuel oil that has been established or can be established by the amide-ammonium salt (A) and impaired by the addition of a lubricity additive (C) is improved or restored by addition of an oil-soluble amine (B). Specifically, the addition of the oil-soluble amine (B) achieves the low-temperature property that has been established can be established by the amide ammonium salt (A) in the absence of the lubricity additive C). Low-temperature properties are understood here to mean, individually or in combination, the cloud point, cold filter plugging point (CFPP), paraffin dispersancy and pour point (PP) of fuel oils.

The response characteristics of low-temperature additives containing amide-ammonium salts (A) is particularly impaired in fuel oils containing more than 10 ppm of lubricity additive (C) and particularly more than 50 ppm and especially more than 100 ppm of lubricity additive (C).

Amide-Ammonium Salt (A)

The oil-soluble amide-ammonium salt (A) is the reaction product of a polycarboxylic acid with a mono- and/or dialkylamine. Preferably, the polycarboxylic acid is selected from monomeric dicarboxylic acids, monomeric polycarboxylic acids and copolymerized dicarboxylic acids. Preferred polycarboxylic acids have 2 or more, for example 3, 4 or more, carboxyl groups; in the case of copolymerized dicarboxylic acids, the polymer molecule contains a number of carboxyl groups corresponding to twice the degree of polymerization. The polycarboxylic acid may also contain heteroatoms such as oxygen, sulfur and/or nitrogen. Preferred polycarboxylic acids, including the carboxyl groups, have 3 to 20 carbon atoms and preferably 4 to 10 carbon atoms, for example 3 to 10 or 4 to 20 carbon atoms. The carbon skeleton bearing the carboxyl groups may be aliphatic or aromatic. It may be interrupted by heteroatoms, for example N, O and S.

Examples of monomeric dicarboxylic acids are maleic acid, fumaric acid, crotonic acid, itaconic acid, succinic acid, $C_1$-$C_{40}$-alkenylsuccinic acid, adipic acid, glutaric acid, pimelic acid, sebacic acid and malonic acid, and also phthalic acid, isophthalic acid and terephthalic acid. Examples of monomeric polycarboxylic acids are trimellitic acid, pyromellitic acid, nitrilotriacetic acid, ethylenediaminetetraacetic acid, methylglycinediacetic acid, glutamic acid-N,N-diacetic acid and mixtures thereof. Particularly preferred monomeric polycarboxylic acids are maleic acid, phthalic acid, nitrilotriacetic acid and ethylenediaminetetraacetic acid.

Examples of copolymerized dicarboxylic acids are copolymers of ethylenically unsaturated dicarboxylic acids, for example of maleic acid, of fumaric acid and/or itaconic acid. Particular preference is given to copolymers of maleic anhydride. Preferred comonomers are those that impart oil solubility to the copolymer. What is meant here by "oil-soluble" is that the copolymer after reaction with the mono- and/or dialkylamine dissolves without residue in the fuel oil to the additized at dosage rates of practical relevance. Particularly suitable comonomers are, for example, olefins, alkyl esters of acrylic acid and methacrylic acid, alkyl vinyl esters and alkyl vinyl ethers. Preferred olefins are α-olefins and styrene. Particular preference is given to comonomers having alkyl radicals having 2 to 40, preferably having 6 to 24, particularly having 8 to 20 and especially having 10 to 16 carbon atoms, for example comonomers having 2 to 24, having 2 to 20, having 2 to 16, having 6 to 40, having 6 to 20, having 6 to 16, having 8 to 40, having 8 to 24, having 8 to 20, having 10 to 40, having 10 to 24 or having 10 to 20 carbon atoms in the alkyl radical. The alkyl radicals may be linear or branched; they are preferably linear. In the case of olefins, the carbon number is based on the alkyl radical bonded to the double bond. Preferred α-olefins are dodecene, tetradecene, hexadecene, octadecene and mixtures thereof. The copolymers may be random copolymers, block copolymers or else alternating polymers. On account of the polymerization properties of maleic anhydride, preference is given to the alternating co- and terpolymers thereof. Examples of suitable co- and terpolymers are poly(maleic anhydride-α-co-olefin), poly(maleic anhydride-co-styrene), poly(maleic anhydride-co-α-alkyl acrylate) and poly(maleic anhydride-co-olefin-co-α-alkyl acrylate). The weight-average molecular weights of the polymeric copolymers are preferably between 400 and 20 000, more preferably between 500 and 10 000, for example between 1000 and 5000, g/mol (by GPC in THF against poly(styrene) standards).

Amide-ammonium salts (A) can be prepared by the action of the polycarboxylic acid with a mono- and/or dialkylamine. It has often been found to be useful to proceed from a reactive derivative of the polycarboxylic acid, for example from an ester, anhydride or acid halide. Particular preference is given here to the acid anhydrides.

The mono- and/or dialkanolamines that are preferred for the preparation of the amide-ammonium salts (A) from polycarboxylic acids or the reactive derivatives thereof are compounds of the formula $NR^1R^2R^3$ in which $R^1$, $R^2$ and $R^3$ may be the same or different, and at least one of these groups is $C_8$-$C_{36}$-alkyl, $C_6$-$C_{36}$-cycloalkyl, $C_8$-$C_{36}$-alkenyl, especially $C_{12}$-$C_{24}$-alkyl, $C_{12}$-$C_{24}$-alkenyl or cyclohexyl, and the other groups are either hydrogen, $C_1$-$C_{36}$-alkyl, $C_2$-$C_{36}$-alkenyl, cyclohexyl, for a group of the formula $(A-O)_x$-E or —$(CH_2)_n$—NYZ, in which A is an ethyl or propyl group, x is a number from 1 to 50, E=H, $C_1$-$C_{30}$-alkyl, $C_5$-$C_{12}$-cycloalkyl or $C_6$-$C_{30}$-aryl, and n=2, 3 or 4, and Y and Z are independently H, $C_1$-$C_{30}$-alkyl or -(A-O)$_x$. Also suitable as mono- and/or dialkylamines are polyamines of the formula —[N—$(CH_2)_n]_m$—$NR^1R^2$ in which n is a number from 1 to 20, and n, $R^1$ and $R^2$ have the definitions given above. The alkyl and alkylene radicals may be linear or branched and contain up to two double bonds. They are preferably linear and largely saturated, meaning that they have iodine numbers of less than 75 g $I_2$/100 g, preferably less than 60 g $I_2$/100 g and especially between 1 and 10 g $I_2$/100 g. Preference is given to secondary amines in which two of the $R^1$, $R^2$ and $R^3$ groups are $C_8$-$C_{36}$-alkyl, $C_6$-$C_{36}$-cycloalkyl, $C_8$-$C_{36}$-alkenyl, especially $C_{12}$-$C_{24}$-alkyl, $C_{12}$-$C_{24}$-alkenyl or cyclohexyl. Suitable monoalkylamines are, for example, octylamine, decylamine, dodecylamine, tetradecylamine, hexadecylamine, octadecylamine, eicosylamine, behenylamine; preferred dialkylamines are, for example, didecylamine, didodecylamine, ditetradecylamine, dihexadecylamine, dioctadecylamine, dieicosylamine, dibehenylamine and mixtures thereof. Specifically, the mono- and dialkylamines contain chain cuts based on natural raw materials, for example cocoamine, tallowamine, hydrogenated tallowamine, dicocoamine, ditallowamine and di(hydrogenated tallowamine). Particularly preferred amine derivatives are amines salts, imides and/or amides, for example amide-ammonium salts of secondary fatty amines, especially of dicocoamine, ditallowamine and distearylamine.

Particularly useful amide-ammonium salts (A) have been found to be oil-soluble polar nitrogen compounds that are obtained by reaction of aliphatic amines, preferably one-chain aliphatic amines, with aliphatic or aromatic mono-, di-, tri- or tetracarboxylic acids or anhydrides thereof (cf. U.S. Pat. No. 4,211,534). Equally suitable as oil-soluble polar nitrogen compounds are amide and ammonium salts of aminoalkylenepolycarboxylic acids such as nitrilotriacetic acid or ethylenediaminetetraacetic acid with secondary amines (cf. EP 0 398 101). Other oil-soluble polar nitrogen compounds are copolymers of maleic anhydride with unsaturated compounds that may optionally be reacted with primary monoalkylamines and/or aliphatic alcohols (cf. EP-A-0 154 177, EP-0 777 712), the reaction products of alkenylspirobislactones with amines (cf. EP-A-0 413 279 B1) and, according to EP-A-0 606 055 A2, reaction products of terpolymers based on α,β-unsaturated dicarboxylic anhydrides, α,β-unsaturated compounds and polyoxyalkylene ethers of lower unsaturated alcohols.

For improvement of the low-temperature properties, the amide-ammonium salt (A) is added to the low-sulfur fuel oil to be treated preferably in amounts of 1 to 100 ppm, more preferably in amounts of 5 to 75 ppm and especially in amounts of 10 to 50 ppm, for example in amounts of 1 to 75 ppm, in amounts of 1 to 50 ppm, in amounts of 5 to 100 ppm, in amounts of 5 to 50 ppm, in amounts of 10 to 100 ppm or in amounts of 10 to 75 ppm (each m/m).

Oil-Soluble Amine (B)

According to the invention, preferred oil-soluble amines (B) are those amines having a boiling point above the initial boiling point of the low-sulfur fuel oil to be additized. Initial boiling point is understood to mean the boiling point at standard pressure. The boiling characteristics of middle distillates may be determined, for example, by means of boiling analysis according to DIN EN ISO 3405. Particular preference is given to amines having a boiling point of at least 110° C., especially those having a boiling point of at least 150° C., for example at least 175° C. This prevents the amine from escaping from the treated low-sulfur fuel oil during transport and/or storage thereof.

Preferred oil-soluble amines (B) have the formula (1)

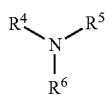

(1)

in which
$R^4$ is an alkyl radical having 8 to 22 carbon atoms or a group of the formula $-(CH_2)_p-[NR^7-(CH_2)_p]_m-NH_2$,
$R^5$ is hydrogen or an alkyl radical having 1 to 22 carbon atoms or a group of the formula $-(CH_2)_p-[NR^7-(CH_2)_p]_m-NH_2$,
$R^6$ is hydrogen or an alkyl radical having 1 to 22 carbon atoms,
$R^7$ is H or an alkyl radical having 1 to 22 carbon atoms,
p is 2 or 3 and
m is 0 or an integer from 1 to 10.

In a first preferred embodiment, the oil-soluble amine (B) is a fatty amine (Bi) bearing at least one alkyl radical having at least 8 carbon atoms, preferably having 12 to 22 and especially having 14 to 20 carbon atoms, for example having 8 to 22 carbon atoms, having 12 to 20 carbon atoms or 14 to 22 carbon atoms. Preferred fatty amines (Bi) have the formula (1) in which
$R^4$ is an alkyl radical having 8 to 22 carbon atoms,
$R^5$ is hydrogen or an alkyl radical having 1 to 22 carbon atoms and
$R^6$ is hydrogen or an alkyl radical having 1 to 22 carbon atoms.

Suitable fatty amines (Bi) include primary, secondary and/or tertiary amines and mixtures thereof.

The fatty amine (Bi), in a first preferred embodiment, is a primary amine in which $R^4$ is an alkyl radical having 8 to 22 carbon atoms, and $R^5$ and $R^6$ are hydrogen. In a particularly preferred embodiment, the fatty amine (Bi) is a mixture of various primary amines.

The fatty amine (Bi), in a second preferred embodiment, is a secondary amine in which $R^4$ is an alkyl radical having 10 to 22 carbon atoms, $R^5$ is an alkyl radical having 1 to 22 carbon atoms and $R^6$ is hydrogen. In particularly preferred secondary amines, $R^5$ is an alkyl radical having 10 to 22 carbon atoms. In a specifically preferred embodiment, $R^4$ and $R^5$ comprise a mixture of different chain lengths. In a further specifically preferred embodiment, the fatty amine (Bi) is a mixture of various secondary amines of the formula (1).

The fatty amine (Bi), in a third preferred embodiment, is a tertiary amine in which $R^4$ is an alkyl radical having 10 to 22 carbon atoms, and $R^5$ and $R^6$ are independently an alkyl radical having 1 to 22 carbon atoms. In particularly preferred tertiary amines of the formula (1), $R^4$ and $R^5$ are independently an alkyl radical having 10 to 22 carbon atoms, and $R^6$ is an alkyl radical having 1 to 6 carbon atoms. In a specifically preferred embodiment, $R^4$, $R^5$ and $R^6$ independently comprise a mixture of different chain lengths. In a further specifically preferred embodiment, the fatty amine (Bi) is a mixture of various tertiary amines of the formula (1).

The alkyl radicals $R^4$, $R^5$ and $R^6$ may independently be linear or branched; if they have at least 5 carbon atoms, they may also be cyclic or contain cyclic structural elements. They are preferably linear. In addition, the alkyl radicals $R^4$, $R^5$ and $R^6$ may independently be saturated or unsaturated. More preferably, they are saturated or essentially saturated. What is meant by "essentially saturated" is that the amines containing them have a Wijs iodine number of not more than 20 g $I_2$/100 g, more preferably of not more than 10 g $I_2$/100 g and especially of not more than 5 g $I_2$/100 g.

Examples of preferred alkyl radicals $R^4$, $R^5$ and $R^6$ having 10 to 20 carbon atoms are decyl, undecyl, dodecyl, tridecyl, tetradecyl, hexadecyl, octadecyl, oleyl and eicosyl radicals and mixtures thereof. If $R^4$, $R^5$ and $R^6$ contain mixtures of different alkyl radicals, the individual chain lengths are preferably each present in the mixtures at 1% to 99% by weight and more preferably at 5% to 95% by weight. Particular preference is given to mixtures of alkyl radicals that are obtained from renewable raw materials, for example cocoalkyl, tallowalkyl and behenyl radicals. Examples of preferred alkyl radicals $R^5$ and $R^6$ having 1 to 9 carbon atoms are methyl, ethyl, propyl, butyl, pentyl, hexyl, heptyl, octyl and nonyl radicals and mixtures thereof. A particularly preferred alkyl radical $R^5$ and $R^6$ having 1-9 carbon atoms is the methyl radical.

Examples of primary fatty amines (Bi) that are preferred in accordance with the invention are decylamine, dodecylamine, tridecylamine, tetradecylamine, hexadecylamine, octadecylamine and eicosylamine and mixtures thereof. Particular preference is given to amines that are obtained from chain cuts of renewable raw materials, for example cocoamine, tallowamine, hydrogenated tallowamine and behenylamine.

Examples of secondary fatty amines (Bi) that are preferred in accordance with the invention are di(decyl)amine, didodecylamine, ditridecylamine, ditetradecylamine, dihexadecylamine, dioctadecylamine, dieicosylamine, dodecyltetradecylamine, dodecylhexadecylamine, dodecylhexadecylamine, tetradecylhexadecylamine, tetradecylhexadecylamine, hexadecyloctadecylamine and mixtures thereof. Particular preference is given to amines that are obtained from chain cuts of renewable raw materials, for example dicocoamine, ditallowamine, di(hydrogenated tallowamine) and behenylamine.

Examples of tertiary fatty amines (Bi) that are preferred in accordance with the invention are N-methyldidecylamine, N-methyldidodecylamine, N-methylditridecylamine, N-methylditetradecylamine, N-methyldihexadecylamine, N-methyldioctadecylamine, N-methyldieicosylamine, N-methyl-N-dodecyltetradecylamine, N-methyl-N-dodecylhexadecylamine, N-methyl-N-tetradecylhexadecylamine, N-methyl-N-hexadecyloctadecylamine and mixtures thereof. Particular preference is given to fatty amines (Bi) that are obtained from chain cuts of renewable raw materials, for example N-methyldicocosfettamine, N-methyditalgfettamine, N-methyldi(hydrogenated tallowamine) and N-methyldibehenylamine.

In the case of fatty amines (Bi) in which the $R^4$, $R^5$ and/or $R^6$ radicals have different definitions, and also in the case of mixtures of fatty amines (Bi), the average alkyl chain length (in molar terms) of the $R^4$, $R^5$ and $R^6$ radicals, if they are not hydrogen, is preferably in the range from 10 to 18 and especially in the range from 12 to 17.5, for example in the range from 10 to 17.5 or from 12 to 18. Fatty amines that are particularly preferred in accordance with the invention are dicocoamine, di(hydrogenated tallow)amine, distearylamine and mixtures thereof.

In a second preferred embodiment, the oil-soluble amine (B) is a polyamine (Bii) bearing at least one group of the formula —$(CH_2)_p$—$[NR^7$—$(CH_2)_p]_m$—$NH_2$ in which $R^7$ is H or an alkyl radical having 1 to 22 carbon atoms, p is 2 or 3 and m is 0 or an integer from 1 to 10. Preferably, $R^7$ is H. Polyamines (Bii) consequently have at least two nitrogen atoms bonded via an alkylene radical having two or three carbon atoms. Particularly preferred polyamines contain 2 to 10, for example two, three or four, nitrogen atoms. Examples of preferred polyamines are ethylenediamine, propylenediamine, diethylenetriamine, dipropylenetriamine, triethylenetetraamine, tetraethylenepentamine, laurylpropylenediamine, tallowpropylenediamine, lauryldipropylenetriamine, tallowdipropylenetriamine and oleyltripropylenetetramine.

The oil-soluble additive (B) is present in the additive, and in the low-sulfur fuel oil additized therewith, at 5-100% by weight, based on the amount of amide-ammonium salt (A). The additive preferably contains 10% to 100% by weight, more preferably 15% to 70% by weight and especially 20% to 50% by weight, for example 5% to 100% by weight, 5% to 70% by weight, 5% to 50% by weight, 10% to 100% by weight, 10% to 70% by weight, 10% to 50% by weight, 15% to 100% by weight, 15% to 50% by weight, 20% to 100% by weight or 30% to 70% by weight, of oil-soluble amine (B), based on the amount of amide-ammonium salt (A).

When the oil-soluble amine (B) is used to improve the low-temperature properties of a low-sulfur fuel oil according to the third subject of the invention, and also to improve the response characteristics of a low-sulfur fuel oil containing lubricity additive (C) to the addition of amide-ammonium salt (A), 5-100% by weight, preferably 10% to 75% by weight, more preferably 15% to 70% by weight and especially 20% to 65% by weight, for example 5% to 75% by weight, 5% to 70% by weight, 5% to 65% by weight, 10% to 100% by weight, 10% to 70% by weight, 10% to 65% by weight, 15% to 100% by weight, 15% to 75% by weight, 15% to 65% by weight, 20% to 100% by weight, 20% to 75% by weight or 30% to 70% by weight, of oil-soluble amine (B), based on the amount present in the fuel oil or to be added thereto, of amide-ammonium salt (A) is added to the low-sulfur fuel oil.

In this third subject of the invention, the oil-soluble amine (B) is added to a low-sulfur fuel oil containing an amide-ammonium salt (A) and a lubricity additive (C). This leads to an improvement in the low-temperature properties, for example a further lowering of the CFPP value and/or an improvement in paraffin dispersion.

Alternatively, the oil-soluble amine (B) according to the fourth subject of the invention may also be added to the low-sulfur fuel oil prior to additization thereof with amide-ammonium salt (A) and lubricity additive (C), so as to prevent the occurrence of the antagonistic effect on subsequent additization with amide-ammonium salt (A) and lubricity additive (C).

Lubricity Additive (C)

Lubricity additives are oil additives that improve the lubricity of low-sulfur fuel oils. In the dosage used, they preferably bring about a reduction in the friction wear value (R; in μm) by the HFRR test in the fuel oil, compared to the same fuel without addition of lubricity additive, by at least 10%, more preferably by at least 20% and especially by at least 25%. The friction wear value can be determined, for example, by means of the HFRR test according to DIN ISO 12156-1. The standard lubricity additives are oil-soluble amphiphilic compounds that form a film on the engine parts to be lubricated.

Lubricity additives (C) that are critical in respect of the impairment of the low-temperature properties established by amide-ammonium salts are amphiphiles having an alkyl or alkenyl radical having 10 to 28 carbon atoms and preferably 12 to 22 carbon atoms, to which a polar head group is bonded. Lubricity additives (C) that are particularly critical in respect of the impairment of the low-temperature properties established by amide-ammonium salts are fatty acids, oligomers of unsaturated fatty acids, alk(en)ylsuccinic acids, partial esters or polyols with fatty acids, oligomers of unsaturated fatty acids and/or alk(en)ylsuccinic acids, and fatty acid amides of alkanolamines. The most pronounced effect is observed with fatty acids. Fatty acids are understood to mean aliphatic monocarboxylic acids having 8 to 32 carbon atoms.

Examples of lubricity additives (C), the antagonistic effect of which is overcome in accordance with the invention, are saturated and especially unsaturated fatty acids having 10 to 28 carbon atoms and preferably having 12 to 22 carbon atoms, for example having 10 to 22 carbon atoms or having 12 to 28 carbon atoms, in the alkyl or alkenyl radical. The antagonistic effect caused by alk(en)ylsuccinic acids having alk(en)yl radicals within the chain length range mentioned is also overcome. The alk(en)yl radical of the fatty acids and/or alk(en)ylsuccinic acids may be linear, branched or else cyclic. In addition, the antagonistic effect caused by partial esters of the fatty acids mentioned with polyhydroxy compounds, for example with ethylene glycol or glycerol, is overcome. Furthermore, the antagonistic effect caused by the amides of the above fatty acids with primary or secondary alkanolamines each having 2 to 4 carbon atoms per alkyl group, for example with ethanolamine, propanolamine, N-methylethanolamine, diethanolamine, is overcome. The term alk(en)yl encompasses alkyl and alkenyl radicals, where alkenyl radicals may be mono- or polyunsaturated.

Examples of lubricity additives within the scope of this invention are lauric acid, myristic acid, palmitic acid, stearic acid, arachic acid, palmitoleic acid, maleic acid, elaidic acid, erucic acid, linolenic acid, linolenic acid, dodecenylsuccinic acid, tetradecenylsuccinic acid, hexadecenylsuccinic acid, octadecenylsuccinic acid and mixtures thereof. In a preferred embodiment, the lubricity additive is a fatty acid mixture obtained from natural raw materials, for example coconut fatty acid, palm oil fatty acid, soya oil fatty acid, colza oil fatty acid, tallow fatty acid, or tall oil fatty acid.

It is optionally possible to use the fatty acids mentioned in a mixture with at least one polycyclic hydrocarbon compound. Preferred polycyclic hydrocarbon compounds are natural resin acids that have been extracted from tree resins, especially conifer resins. The resin acids are preferably selected from the group consisting of abietic acid, dihydroabietic acid, tetrahydroabietic acid, dehydroabietic acid, neoabietic acid, pimaric acid, levopimaric acid, palustric acid and derivatives thereof.

The above-describe saturated and especially unsaturated fatty acids having 10 to 28 carbon atoms, and also the alk(en)ylsuccinic acids having $C_{10}$-$C_{28}$-alk(en)yl radicals and the preferred embodiments thereof, are also preferred as starting material for the preparation of polyol partial esters and alkanolamides.

Preferred polyols have 2 to 10 carbon atoms and 2 to 6 OH groups, but not more than one OH group per carbon atom. Examples of preferred polyols are ethylene glycol, propylene glycol, butylene glycol, glycerol, pentaerythritol and sorbitol. What is meant by partial esters is that at least one OH group of the polyol is not esterified. Examples of partial esters of fatty acids with polyhydroxy compounds are ethylene glycol monostearate, ethylene glycol monotalloate, glycerol monooleate and glycerol monotalloate.

Preferred alkanolamines are primary and secondary amines bearing one and two hydroxyalkyl radicals respectively. Preferred hydroxyalkyl radicals have two to 4 carbon atoms and especially 2 or 3 carbon atoms. Examples of preferred alkanolamines are ethanolamine, propanolamine, diethanolamine and dipropanolamine. Examples of fatty amides of fatty acids with hydroxy amines are stearic acid monoethanolamide, tall oil fatty acid monoethanolamide, tall oil fatty acid monopropanolamide, stearic acid diethanolamide, tall oil fatty acid diethanolamide and tall oil fatty acid dipropanolamide.

Preferred low-sulfur fuel oils contain 20 to 2000 ppm, especially preferably 50 to 1000 ppm and specifically 100 to 500 ppm, for example 10 to 2000 ppm, 10 to 1000 ppm, 10 to 500 ppm, 20 to 1000 ppm, 20 to 500 ppm, 50 to 2000 ppm, 50 to 500 ppm, 100 to 2000 ppm or 100 to 1000 ppm (each m/m) of the lubricity additive (C).

Resins (D)

The low-temperature additive of the invention comprises at least one resin formed from at least one aromatic compound bearing an alkyl radical and at least one aldehyde and/or ketone (D). The alkyl radical may be bonded to the aromatic system directly or via an ester or ether group. Preferred alkyl radicals may be saturated or unsaturated. They preferably have 1 to 20, particularly 4 to 16 and especially 6 to 12 carbon atoms, for example 1 to 16, 1 to 12, 4 to 20, 4 to 12, 6 to 20 or 6 to 16 carbon atoms. Examples of preferred alkyl radicals are the n-, iso- and tert-butyl, n- and isopentyl, n- and isohexyl, n- and isooctyl, n- and isononyl, n- and isodecyl, n- and isododecyl, tetradecyl, hexadecyl, octadecyl, tripropenyl, tetrapropenyl, tributenyl, tetrabutenyl, poly(propenyl) and poly(isobutenyl) radical.

Preferred resins are firstly alkyl phenol-aldehyde resins which derive from alkylphenols having one or two alkyl radicals in ortho and/or para position to the OH group. Particularly preferred starting materials are alkylphenols bearing at least two hydrogen atoms capable of condensation with aldehydes on the aromatic system, and especially monoalkylated phenols. More preferably, the alkyl radical is in the para position to the phenolic OH group. In a preferred embodiment, the alkylphenol resins (D) are prepared using mixtures of alkylphenols with different alkyl radicals. The alkyl radicals may, for example, have different chain lengths and/or different branching patterns (isomers). For example, useful resins have been found to be those based on butylphenol on the one hand, and octyl-, nonyl- and/or dodecylphenol in a molar ratio of 1:10 to 10:1 on the other hand.

Further preferred alkylphenol resins contain structural units of phenol analogs such as salicylic acid, hydroxybenzoic acid and derivatives thereof, such as esters, amides and salts. Particularly preferred esters, amides and salts derive from alcohols or amines bearing an alkyl radical having the above-described number of carbon atoms.

Suitable aldehydes for the condensation of aromatic compounds bearing an alkyl radical are those having 1 to 12 carbon atoms and preferably those having 1 to 4 carbon atoms, for example formaldehyde, acetaldehyde, propionaldehyde, butyraldehyde, 2-ethylhexanal, benzaldehyde, glyoxalic acid and their reactive equivalents such as paraformaldehyde and trioxane. Particular preference is given to formaldehyde in the form of paraformaldehyde and especially of formalin.

The molecular weight of the resin (D) measured by means of gel permeation chromatography against poly(styrene) standards in THF is preferably 500 to 25 000 g/mol, more preferably 800 to 10 000 g/mol and especially 1000 to 5000 g/mol, for example 1500 to 3000 g/mol. It is a prerequisite here that the resin (D) is oil-soluble at least application-relevant concentrations of 0.001% to 1% by weight.

In a preferred embodiment, the resin of aromatic compound bearing at least one alkyl radical and aldehyde and/or ketone (D) is an oligomer or polymer having a repeat structural unit of the formula (2)

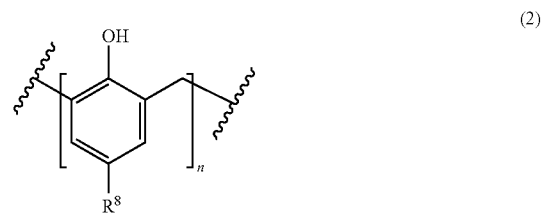

(2)

in which
R$^8$ is C$_1$-C$_{24}$-alkyl, O—R$^9$, O—C(O)—R$^9$ or —C(O)—O—R$^9$,
R$^9$ is C$_1$-C$_{22}$-alkyl or C$_2$-C$_{22}$-alkenyl and n is a number from 2 to 100.

Preferably, R$^8$ is C$_1$-C$_{20}$-alkyl and especially C$_4$-C$_{16}$-, for example C$_6$-C$_{12}$-alkyl. Further preferably, R$^9$ is C$_1$-C$_{20}$-alkyl or C$_2$-C$_{20}$-alkenyl and especially C$_4$-C$_{16}$-alkyl or -alkenyl, for example C$_6$-C$_{12}$-alkyl or -alkenyl. Preferably, n is a number from 2 to 50 and especially a number from 3 to 25, for example a number from 5 to 15.

Resins formed from aromatic compounds bearing at least one alkyl radical and aldehydes and/or ketones (D) are obtainable by known methods, for example by condensation of the corresponding alkylphenols with formaldehyde, i.e. with 0.5 to 1.5 mol, preferably 0.8 to 1.2 mol, of formaldehyde per mole of alkylphenol. The condensation can be effected without solvent, but is preferably effected in the presence of an inert organic solvent of zero or only partial water miscibility, for example a mineral oil, alcohol, ether or the like. Particular preference is given to solvents that can form azeotropes with water. Solvents of this kind that are used are especially aromatics such as toluene, xylene, diethylbenzene and higher-boiling commercial solvent mixtures such as Shellsol® AB and Solvent Naphtha. Also suitable as solvents are fatty acids and derivatives thereof, for example esters with lower alcohols having 1 to 5 carbon atoms, for example ethanol and especially methanol. The condensation is preferably effected between 70 and 200° C., for example between 90 and 160° C. It is typically catalyzed by 0.05% to 5% by weight of bases or preferably by 0.05% to 5% by weight of acid. Catalysts commonly used as acidic catalysts, as well as carboxylic acids such as acetic acid and oxalic acid, are in particular strong mineral acids such as hydrochloric acid, phosphoric acid and sulfuric acid, and sulfonic acids. Particularly suitable catalysts are sulfonic acids containing at least one sulfo group and at least one saturated or unsaturated, linear, branched and/or cyclic hydrocarbyl radical having 1 to 40 carbon atoms and preferably having 3 to 24 carbon atoms. Particular preference is given to aromatic sulfonic acids, especially alkylaromatic monosulfonic acids having one or more C$_1$-C$_{28}$-alkyl radicals and especially those having C$_3$-C$_{22}$-alkyl radicals, for example having C$_1$-C$_{22}$-alkyl radicals. Suitable examples are methanesulfonic acid, butanesulfonic acid, benzenesulfonic acid, p-toluenesulfonic acid, xylenesulfonic acid, 2-mesitylenesulfonic acid, 4-ethylbenzenesulfonic acid, isopropylbenzenesulfonic acid, 4-butylbenzenesulfonic acid, 4-octylbenzenesulfonic acid; dodecylbenzenesulfonic acid, didodecylbenzenesulfonic acid, naphthalenesulfonic acid. Mixtures of these sulfonic acids are also suitable. Typically, these remain in the product as such or in neutralized form after the reaction has ended. Neutralization is preferably accomplished using amines and/or aromatic bases since they can remain in the product; salts that contain metal ions and hence form ash are typically separated off.

The proportion of resin (D) in the additive of the invention and/or the additized fuel oil is between 0.1 and 10 parts by weight, based on the amount of amide-ammonium salt (A). It is preferably between 0.2 and 5 parts by weight, for example between 0.1 and 5 or between 0.2 and 10 parts by weight, based on the amount of amide-ammonium salt (A). In the additized fuel oil, the content of the resin (D) is preferably between 1% and 50% by weight and more preferably between 2% and 30% by weight, for example between 2% and 50% by weight or between 1% and 30% by weight, based in each case on the content of lubricity additive (C) in the fuel oil.

Low-Sulfur Fuel Oil

Low-sulfur fuel oils in the context of the invention are understood to mean fuel oils having a sulfur content of not more than 50 ppm, preferably not more than 20 ppm, and especially with a sulfur content of not more than 10 ppm (m/m). The sulfur content of fuel oils can be determined, for example, according to EN ISO 20846 or EN ISO 20884.

Preferred fuel oils are middle distillates. Middle distillate refers more particularly to those mineral oils that are obtained by distillation of crude oil and boil in the range from about 150 to 450° C. and especially in the range from about 170 to 390° C., for example kerosene, jet fuel, diesel and heating oil. Typically, middle distillates contain about 5% to 50% by weight, for example about 10% to 35% by weight, of n-paraffins, of which the longer-chain paraffins can crystallize out in the course of cooling and impair the flowability of the middle distillate. Low-temperature additives of the invention are particularly advantageous in middle distillates having an aromatic content of less than 40% by weight, for example less than 30% by weight. The compositions of the invention are also particularly advantageous in middle distillate having a low final boiling point, i.e. in those middle distillates having 90% distillation points below 350° C., especially below 340° C. and in special cases below 335° C., and additionally in those middle distillate having boiling ranges between 20% and 90% distillation volume of less than 140° C. and particularly of less than 125° C. and especially between 80 and 120° C., for example between 80 and 140° C. or between 80 and 125° C. Aromatic compounds are understood to mean the sum total of mono-, di- and polycyclic aromatic compounds, as can be measured by means of HPLC to DIN EN 12916 (2001 edition).

Preferred fuel oils may also comprise or consist of one or more synthetic fuels. In a preferred embodiment, the fuel oils contain a total of 1% to 50% by volume, more preferably 2% to 30% by volume and especially 3% to 20% by volume of one or more synthetic fuels. Examples of preferred synthetic fuels are hydrotreated vegetable oils (HVOs). These are obtainable, for example, by catalytic hydrodeoxygenation of vegetable oils and fats, and also of animal fats. It is optionally possible to subject the hydrogenated vegetable oils to an isomerization for adjustment of the low-temperature properties. A further example is synthetic fuels produced by means of Fischer-Tropsch synthesis.

According to the invention, low-sulfur fuel oils having improved cold-flow properties preferably contain 1 to 100 ppm, more preferably 5 to 75 ppm and especially 10 to 50 ppm, for example 1 to 75 ppm, 1 to 50 ppm, 5 to 100 ppm, 5 to 50 ppm, 10 to 100 ppm or 10 to 75 ppm (each m/m) of amide-ammonium salt (A), and, based on the amount of amide-ammonium salt, 5-100% by weight, preferably 10% to 70% by weight and especially 15% to 65% by weight, for example 5% to 70% by weight, 5% to 65% by weight, 10% to 100% by weight, 10% to 65% by weight, 15% to 100% by weight or 15% to 70% by weight, of oil-soluble amine (B).

Added to the low-sulfur fuel oil in order to improve the low-temperature properties and especially the CFPP value and/or the paraffin dispersancy thereof are preferably 1 to 100 ppm, more preferably 5 to 75 ppm and especially 10 to 50 ppm, for example 1 to 75 ppm, 1 to 50 ppm, 5 to 100 ppm, 5 to 50 ppm, 10 to 100 ppm or 10 to 75 ppm (each m/m) of amide-ammonium salt (A), and, based on the amount of amide-ammonium salt (A), 5-100% by weight, preferably 10% to 70% by weight and especially 15% to 65% by weight, for example 5% to 70% by weight, 5% to 65% by weight, 10% to 100% by weight, 10% to 65% by weight, 15% to 100% by weight or 15% to 70% by weight, of oil-soluble amine (B).

Further Components (E)-(G)

In a preferred embodiment, the amide-ammonium salt (A) is added to the low-sulfur fuel oil in combination with one or more further known cold flow improvers. The amide-ammonium salt (A), the inventive additive composed of (A), (B) and (D), and also the further cold flow improvers, may each be added to the fuel oil separately or else as a constituent of an additive formulation. Preferred additive formulations and/or the fuel oils treated therewith accordingly also contain one or more further known cold flow improvers. Preferred further cold flow improvers are E) oil-soluble polyoxyalkylene compounds
F) comb polymers
G) ethylene copolymers In a further preferred embodiment, the low-temperature additives of the invention and/or the fuel oils treated therewith comprise an oil-soluble polyoxyalkylene compound (E) as a further cold flow improver. Examples of preferred oil-soluble polyoxyalkylene compounds (E) are esters, ethers and ether/esters of polyols bearing at least one alkyl radical having 12 to 30 carbon atoms. In a preferred embodiment, the oil-soluble polyoxyalkylene compounds (E) have at least 2, for example 3, 4 or 5, aliphatic hydrocarbyl radicals. These radicals preferably independently have 16 to 26 carbon atoms, for example 17 to 24 carbon atoms. These radicals of the oil-soluble polyoxyalkylene compounds (E) are preferably linear. Further preferably, they are very substantially saturated, and are especially alkyl radicals. Esters are particularly preferred.

Polyols particularly suitable for preparation of preferred polyoxyalkylene compounds (E) are polyethylene glycols, polypropylene glycols, polybutylene glycols and the copolymers thereof having an average molecular weight of 100 to 5000 g/mol and preferably of 200 to 2000 g/mol. In a preferred embodiment, the oil-soluble polyoxyalkylene compounds (E) derive from polyols having 3 or more OH groups, more preferably from polyols having 3 to 50 OH groups and especially from polyols having 4 to 10 OH groups, for example from polyols having 3 to 10 OH groups or 4 to 50 OH groups. Examples of preferred polyols are neopentyl glycol, glycerol, trimethylolpropane, trimethylolpropane, sorbitan, pentaerythritol, and the oligomers having 2 to 10 monomer units that are obtainable therefrom by condensation, for example glycerol. Also suitable as polyols are higher polyols, for example sorbitol, sucrose, glucose, fructose and oligomers thereof, for example cyclodextrin, provided that their esterified or etherified alkoxylates are oil-soluble at least in application-relevant amounts. Preferred polyoxyalkylene compounds that have a branched polyoxyalkylene core to which multiple alkyl radicals that impart oil solubility are bonded.

The polyols have generally been reacted with 3 to 70 mol of alkylene oxide, preferably 4 to 50 and especially 5 to 20 mol of alkylene oxide, for example with 3 to 50, with 3 to 20, with 4 to 70, with 4 to 30, with 5 to 70 or with 5 to 20 mol of alkylene oxide per hydroxyl group of the polyol. Preferred alkylene oxides are ethylene oxide, propylene oxide and/or butylene oxide. The alkoxylation is effected by known methods.

Fatty acids preferred for the esterification of the alkoxylated polyols have 12 to 30 and especially 16 to 26 carbon atoms, for example 12 to 26 or 16 to 30 carbon atoms. Suitable fatty acids are, for example, lauric acid, tridecanoic acid, myristic acid, pentadecanoic acid, palmitic acid, margaric acid, stearic acid, isostearic acid, arachic acid and behenic acid, oleic acid and erucic acid, palmitoleic acid, myristoleic acid, ricinoleic acid, and fatty acid mixtures obtained from natural fats and oils. Preferred fatty acid mixtures contain more than 50 mol % of fatty acids having at least 20 carbon atoms. Preferably less than 50 mol % of the fatty acids used for esterification contain double bonds, particularly less than 10 mol %; they are especially very substantially saturated. The esterification may also proceed from reactive derivatives of the fatty acids, such as esters with lower alcohols (e.g. methyl or ethyl esters) or anhydrides.

In the context of the present invention, what is meant by very substantially saturated is an iodine number (according to Wijs as per EN 14111) of the fatty acid used or fatty alcohol used of up to 5 g of $I_2$ per 100 g of fatty acid or fatty alcohol.

Polyol and fatty acid are used for the esterification, based on the content of hydroxyl groups on the one hand and carboxyl groups on the other hand, in a ratio of 1.5:1 to 1:1.5, preferably in a ratio of 1.1:1 to 1:1.1, and especially in equimolar amounts. The acid number of the esters formed is generally below 15 mg KOH/g, preferably below 10 mg KOH/g, especially below 5 mg KOH/g. The OH number of the esters is preferably below 20 mg KOH/g and especially below 10 mg/KOH/g.

In a further preferred embodiment, after the alkoxylation of the polyol, the terminal hydroxyl groups are converted to terminal carboxyl groups, for example by oxidation or by reaction with dicarboxylic acids. Reaction with fatty alcohols having 8 to 50, particularly 12 to 30 and especially 16 to 26 carbon atoms likewise affords polyoxyalkylene esters of the invention. Preferred fatty alcohols or fatty acid mixtures contain more than 50 mol % of fatty alcohols having at least 20 carbon atoms. Preferably less than 50 mol % of the fatty alcohols used for esterification contain double bonds, particularly less than 10 mol %; they are especially very substantially saturated. Also suitable in accordance with the invention are esters of alkoxylated fatty alcohols with fatty acids which contain the abovementioned proportions of poly(alkylene oxides), and the fatty alcohol and fatty acid of which have the abovementioned alkyl chain lengths and levels of saturation.

In a further preferred embodiment, the above-described alkoxylated polyols are converted to polyoxyalkylene compounds (E) by etherification with fatty alcohols having 8 to 50, particularly 12 to 30 and especially 16 to 26 carbon atoms, for example having 8 to 30, having 8 to 26, having 12 to 50, having 12 to 26, having 16 to 50 or having 16 to 30 carbon atoms. The fatty alcohols preferred for this purpose are linear and very substantially saturated. The etherification is preferably effected completely or at least very substantially completely. The etherification is conducted by known methods.

Particularly preferred polyoxyalkylene compounds (E) derive from polyols having 3, 4 and 5 OH groups, which bear about 5 to 10 mol % of ethylene oxide-derived structural units per hydroxyl group of the polyol and have been esterified very substantially completely with very substantially saturated $C_{17}$-$C_{24}$ fatty acids. Further particularly preferred polyoxyalkylene compounds (E) are polyethylene glycols that have been esterified with very substantially saturated $C_{17}$-$C_{24}$ fatty acids and have molecular weights of about 350 to 1000 g/mol. Examples of particularly suitable polyoxyalkylene compounds (E) are polyethylene glycols that have been esterified with stearic acid and especially with behenic acid and have molecular weights between 350 and 800 g/mol, such as neopentyl glycol 14-ethylene oxide distearate (neopentyl glycol alkoxylated with 14 mol of ethylene oxide and then esterified with 2 mol of stearic acid), neopentyl glycol 14-ethylene oxide dibehenate, glycerol 20-ethylene oxide tristearate, glycerol 20-ethylene oxide dibehenate, glycerol 20-ethylene oxide tribehenate, trimethylolpropane 22-ethylene oxide tribehenate, sorbitan 25-ethylene oxide tristearate, sorbitan 25-ethylene oxide tetrastearate, sorbitan 25-ethylene oxide tribehenate, sorbitan 25-ethylene oxide tetrabehenate; pentaerythritol 30-ethylene oxide tribehenate, pentaerythritol 30-ethylene oxide tetrastearate, pentaerythritol 30-ethylene oxide tetrabehenate and pentaerythritol 20-ethylene oxide 10-propylene oxide tetrabehenate.

In a further preferred embodiment, the low-temperature additives of the invention and/or the fuel oils treated therewith comprise a comb polymer (F) as a further cold flow improver. Preferred comb polymers (F) can be described, for example, by the formula (3)

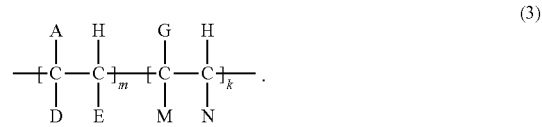

(3)

In this formula:

A is $R^{10}$, $COOR^{10}$, $OCOR^{10}$, $R^{11}$—$COOR^{10}$, $OR^{10}$;

D is H, $CH_3$, A or $R^{11}$;

E is H, A;

G is H, $R^{11}$, $R^{11}$—$COOR^{10}$, an aryl radical or a heterocyclic radical;

M is H, $COOR^{11}$, $OCOR^{11}$, $OR^{11}$, COOH;

N is H, $R^{11}$, $COOR^{11}$, $OCOR^{11}$, an aryl radical;

$R^{10}$ a hydrocarbon chain having 8 to 20, preferably 10 to 18, carbon atoms;

$R^{11}$ a hydrocarbon chain having 1 to 10 carbon atoms;
m is a number between 0.4 and 1.0; and
k is a number between 0 and 0.6.

Preferred comb polymers (F) are, for example, copolymers of ethylenically unsaturated dicarboxylic esters, for example maleic or fumaric esters, with other ethylenically unsaturated monomers, such as olefins or vinyl esters, for example vinyl acetate. Particularly suitable olefins here are α-olefins having 10 to 20 and especially 12 to 18 carbon atoms, for example 1-decene, 1-dodecene, 1-tetradecene, 1-hexadecene, 1-octadecene and mixtures thereof. Also suitable as comonomers are longer-chain olefins based on oligomerized $C_2$-$C_6$ olefins, for example poly(isobutylene), having a high proportion of total double bonds. Typically, these copolymers are esterified to an extent of at least 50 mol %, based on the content of carboxyl groups thereof, with alcohols having 10 to 20 and especially 12 to 18 carbon atoms. Suitable alcohols include n-decan-1-ol, n-dodecan-1-ol, n-tetradecan-1-ol, n-hexadecan-1-ol, n-octadecan-1-ol and mixtures thereof. Particularly suitable are mixtures of n-tetradecan-1-ol and n-hexadecan-1-ol.

Likewise suitable as comb polymers (F) are poly(alkyl acrylates), poly(alkyl methacrylates) and poly(alkyl vinyl ethers) which derive from fatty alcohols having 10 to 20 and especially 12 to 18 carbon atoms, and poly(vinyl esters) that derive from fatty acids having 10 to 20 and especially 12 to 18 carbon atoms. Preferred comb polymers (F) have a weight-average molecular weight between 10 000 and 200 000 g/mol.

In a further preferred embodiment, the low-temperature additives of the invention and/or the fuel oils treated therewith comprise an ethylene copolymer (G) as a further cold flow improver. Preferred ethylene copolymers (G) are copolymers of ethylene and olefinically unsaturated compounds. Suitable ethylene copolymers (G) are especially those which, as well as ethylene, contain 8 to 21 mol % and especially 10 to 18 mol % of one or more olefinically unsaturated compounds as comonomers. Preferred olefinically unsaturated compounds are vinyl esters, acrylic esters, methacrylic esters, alkyl vinyl ethers and/or alkenes.

Vinyl esters preferred as comonomer have the formula (4)

$$CH_2\!=\!CH\!-\!OCOR^{12} \quad (4)$$

in which $R^{12}$ is $C_1$- to $C_{30}$-alkyl, preferably $C_4$- to $C_{16}$-alkyl and especially $C_6$- to $C_{12}$-alkyl, for example $C_1$- to $C_{16}$-alkyl or $C_1$- to $C_{12}$-alkyl. In a further embodiment, the alkyl groups mentioned may be substituted by one or more hydroxyl groups. In a further preferred embodiment, $R^{12}$ is a linear or branched alkyl radical and more preferably a neoalkyl radical having 7 to 11 carbon atoms, especially having 8, 9 or 10 carbon atoms. Particularly preferred vinyl esters derive from secondary and especially tertiary carboxylic acids, the branch of which is in the alpha position to the carbonyl group. Suitable vinyl esters include vinyl acetate, vinyl propionate, vinyl butyrate, vinyl isobutyrate, vinyl hexanoate, vinyl heptanoate, vinyl octanoate, vinyl pivalate, vinyl 2-ethylhexanoate, vinyl laurate, vinyl stearate and Versatic esters such as vinyl neononanoate, vinyl neodecanoate, vinyl neoundecanoate.

In a further preferred embodiment, the ethylene copolymers (G) contain vinyl acetate and at least one further vinyl ester of the formula 4 in which $R^{12}$ is $C_4$- to $C_{30}$-alkyl, preferably $C_4$- to $C_{16}$-alkyl, especially $C_6$- to $C_{12}$-alkyl.

The acrylic esters preferred as comonomer are those of the formula (5)

$$CH_2\!=\!CR^{13}\!-\!COOR^{14} \quad (5)$$

in which $R^{13}$ is hydrogen or methyl and $R^{14}$ is $C_1$- to $C_{30}$-alkyl, preferably $C_4$- to $C_{16}$-alkyl and especially $C_6$- to $C_{12}$-alkyl, for example $C_1$- to $C_{16}$-alkyl or $C_1$- to $C_{12}$-alkyl. Suitable acrylic esters include, for example, methyl (meth)acrylate, ethyl (meth)acrylate, propyl (meth)acrylate, n- and isobutyl (meth)acrylate, hexyl (meth)acrylate, octyl (meth)acrylate, 2-ethylhexyl (meth)acrylate, decyl (meth)acrylate, dodecyl (meth)acrylate, tetradecyl (meth)acrylate, hexadecyl (meth)acrylate, octadecyl (meth)acrylate and mixtures of these comonomers.

The alkyl vinyl ethers preferred as comonomer are compounds of the formula (6)

$$CH_2\!=\!CH\!-\!OR^{15} \quad (6)$$

in which $R^{15}$ is $C_1$- to $C_{30}$-alkyl, preferably $C_4$- to $C_{16}$-alkyl and especially $C_6$- to $C_{12}$-alkyl, for example $C_1$- to $C_{16}$-alkyl or $C_1$- to $C_{12}$-alkyl. Suitable alkyl vinyl ethers include methyl vinyl ether, ethyl vinyl ether, isobutyl vinyl ether. In a further embodiment, the alkyl groups mentioned may be substituted by one or more hydroxyl groups.

The alkenes preferred as comonomer are monounsaturated hydrocarbons having 3 to 30 carbon atoms, particularly having 4 to 16 carbon atoms and especially having 5 to 12 carbon atoms, for example having 3 to 16 or 3 to 12 carbon atoms. Preferred alkenes include propene, butene, isobutylene, pentene, hexene, 4-methylpentene, octene, diisobutylene, and norbornene and derivatives thereof such as methylnorbornene and vinylnorbornene.

Particularly preferred ethylene copolymers (G) are terpolymers which, apart from ethylene, contain 3.5 to 20 mol %, especially 8 to 15 mol %, of vinyl acetate and 0.1 to 12 mol %, especially 0.2 to 5 mol %, of at least one relatively long-chain and preferably branched vinyl ester, for example vinyl 2-ethylhexanoate, vinyl neononanoate or vinyl neodecanoate, where the total comonomer content of the terpolymers is preferably between 8 and 21 mol %, especially between 12 and 20 18 mol %, for example between 8 and 18 mol % or between 12 and 21 mol %. Further particularly preferred copolymers contain, as well as ethylene and 8 to 18 mol % of a vinyl ester of $C_2$ to $C_{12}$ carboxylic acids, also 0.5 to 10 mol % of olefins such as propene, butene, isobutylene, hexene, 4-methylpentene, octene, diisobutylene and/or norbornene.

Preferably, the ethylene copolymers (G) have a melt viscosity at 140° C. of 20 to 10 000 mPas, particularly of 30 to 5000 Pas, especially of 50 to 2000 mPas. The weight-average molecular weight determined by means of gel permeation chromatography in THF against poly(styrene) standards is preferably between 3500 and 30 000 g/mol and more preferably between 5000 and 15 000 g/mol. The degrees of branching determined by means of $^1$H NMR spectroscopy are preferably between 1 and 9 $CH_3/100$ $CH_2$ groups, especially between 2 and 6 $CH_3/100$ $CH_2$ groups, which do not originate from the comonomers.

In a preferred embodiment, mixtures of two or more of the abovementioned ethylene copolymers (G) are used. The ethylene copolymers (G) that form the basis of such mixtures differ in at least one characteristic; for example, they may contain different comonomers or have different comonomer contents, molecular weights and/or levels of branching.

The mixing ratio between the additive of the invention and the further constituents (E), (F) and/or (G) may vary according to the application. In preferred additives, the mixing ratio between the additive of the invention on the one hand and the further constituents (E), (F) and/or (G), based on the active ingredients, is preferably in each case between 1:20 and 20:1, more preferably between 1:10 and 10:1 and especially between 1:5 and 5:1 (m/m), for example between 1:20 and 10:1, between 1:20 and 5:1, between 1:10 and 20:1, between 1:10 and 5:1, between 1:5 and 20:1 or between 1:5 and 10:1.

The cold additives of the invention, for the purpose of easier handling, are preferably used as concentrates containing, as well the low-temperature additive, 10% to 95% by weight, preferably 20% to 80% by weight and especially 25% to 60% by weight of solvent, for example 10% to 80% by weight, 10% to 60% by weight, 20% to 95% by weight, 20% to 60% by weight, 25% to 95% by weight or 25% to 80% by weight of solvent. Preferred solvents are higher-boiling aliphatic, aromatic hydrocarbons, alcohols, esters, ethers and mixtures thereof.

The low-temperature additives of the invention may be used alone or else together with other additives, for example with further cold flow improvers, with dewaxing aids, with detergent additives, with antioxidants, cetane number improvers, dehazers, demulsifiers, defoamers, dyes, corrosion inhibitors, lubricity additives, sludge inhibitors, odorants and/or additions for lowering the cloud point.

The additive of the invention improves the low-temperature properties of low-sulfur fuel oils, such as kerosene, jet fuel, diesel, marine diesel and heating oil, which contain a lubricity additive (C). The improvement is manifested, for example, in the lowering of cloud point, pour point, CFP P value and/or an improvement in paraffin dispersancy. It is particularly effective in fuel oils having a low aromatic content and especially in fuel oils having an aromatic content of less than 40% by weight, for example less than 30% by weight. The additive of the invention is also particularly effective in fuel oils having a low final boiling point, and especially in fuel oils having a 90% distillation point of below 350° C., particularly of below 340° C. and especially of below 335° C. The additive of the invention is also particularly effective in fuel oils having boiling ranges between 20% and 90% distillation volume of less than 140° C. and particularly of less than 125° C. and especially between 100 and 120° C., for example between 100 and 140° C. or between 100 and 125° C. The additive of the invention is particularly effective in fuel oils having a simultaneously low aromatics content and low final boiling point.

The advantages of the various aspects of the present invention on paraffin dispersancy are particularly apparent when the cooling of the fuel oil is rapid, for example at a cooling rate of −0.5° C./min or faster, for example −1.5° C./min or −3° C./min. The advantages of the various aspects of the present invention are also manifested particularly markedly in the course of prolonged storage for more than 16 hours, for example 24 hours, 60 hours or more. Advantages are also particularly marked in the course of storage of the additized fuel oil at temperatures of 5° C. or more, for example 8° C. or more and especially 10° C. or more below the cloud point of the fuel oil. The additives of the invention are particularly advantageous in the case of storage for a long period at very low temperature.

EXAMPLES

All figures in percent and also in ppm are based on parts by weight, unless indicated otherwise.

For assessment of the improvement in the low-temperature properties of fuel oils by the additives of the invention, the fuel oils characterized in table 1 were used.

Measurements of the cloud point were made according to ISO 3015, and those of the CFPP value (cold filter plugging test) according to EN 116. Molecular weights were determined by means of gel permeation chromatography (GPC) in THF against poly(styrene) standards. The amounts of oil-soluble amine B (ppm) used in the experiments in tables 3 to 8 are additionally displayed as % by weight based on the amount (active ingredient content) of amide-ammonium salt (A) added to the fuel oil.

Paraffin dispersancy was determined in sedimentation tests that were conducted as follows:

350 ml of the fuel oil was heated to 60° C. in a graduated measuring cylinder, and the amounts of the additives characterized in tables 2A to 2D that are specified in tables 4, 7 and 8 were added. The dosage rates specified in the tables indicate the masses of active ingredients added in each case, based on the amount of the fuel oil (ppm by mass).

The fuel oil thus treated was cooled down to room temperature. 50 ml of the sample was taken for determination of CFPP and cloud point (before). The remaining 300 ml in the graduated measuring cylinder was cooled down to the respective storage temperature at a cooling rate of −1.5° C./minute in a refrigerator. After the storage time specified in tables 4 and 7, the sample was assessed visually. This involved determining and assessing the volume of the sedimented paraffin phase and the appearance of the fuel oil phase above it. Quantification was effected in percent by volume of sediment. A small amount of sediment and a fuel oil phase having maximum homogeneity of cloudiness show good paraffin dispersancy.

In addition, directly after the cold storage, the upper and lower 20% by volume of the sample were isolated, and cloud point and CFPP of the two phases were determined.

The sedimentation test was considered to have been passed if the following five criteria were satisfied:

Criterion 1: The visual assessment of dispersion (vis) must have uniform cloudiness of the sample or a sediment volume of <1% (d). In the case of presence of a greater amount of sediment (s), the test is considered to have been failed.

Criterion 2: The CP of the lower phase may be not more than 2 K above the CP of the oil before the storage ($\Delta CP_u$).

Criterion 3: The CP of the upper phase may be not more than 2 K below the CP of the oil before the storage ($\Delta CP_o$).

Criterion 4: The CFPP of the lower phase may be not more than 2 K above the CFPP of the oil before the storage ($\Delta CFPP_u$).

Criterion 5: The CFPP of the upper phase may be not more than 2 K below the CFPP of the oil before the storage ($\Delta CFPP_u$).

Only a small variance in the cloud point and in the cold filter plugging point of the lower phase and of the upper phase from the blank value of the oil shows good paraffin dispersancy.

TABLE 1

Characterization of the test oils used:

|  |  | Test oil 1 | Test oil 2 | Test oil 3 | Test oil 4 | Test oil 5 | Test oil 6 | Test oil 7 |
|---|---|---|---|---|---|---|---|---|
| Distillation |  |  |  |  |  |  |  |  |
| IBP | [° C.] | 196.7 | 176.8 | 176.2 | 187.3 | 201.4 | 173.2 | 183.4 |
| 20% | [° C.] | 240.8 | 219.6 | 223.1 | 246.7 | 249.7 | 223.2 | 239.2 |
| 90% | [° C.] | 327.2 | 318.9 | 331.0 | 332.8 | 333.8 | 332.9 | 328.1 |
| (90-20) % | [° C.] | 86.4 | 99.3 | 107.9 | 86.1 | 84.1 | 109.7 | 88.9 |
| FBP | [° C.] | 355.1 | 340.1 | 358.1 | 360.6 | 354.9 | 357.4 | 358.7 |
| Cloud point | [° C.] | −11.2 | −16.0 | −7.1 | −7.1 | −8 | −7.8 | −7.0 |
| CFPP | [° C.] | −11 | −18 | −10 | −8 | −8 | −8 | −8 |
| Pour point | [° C.] | −21 | −24 | −15 | −15 | −12 | −18 | −15 |
| Density @15° C. [g/cm$^3$] |  | 0.8398 | 0.8412 | 0.8304 | 0838 | 0.8563 | 0.8328 | 0837 |
| Sulfur content [ppm] |  | 9 | 7 | 9 | 8 | 7 | 9 | 9 |
| Aromatic content [% by wt.] |  | 32.75 | 29.9 | 24.7 | 28.67 | 23.94 | 19.09 | 29.5 |
| of which mono [% by wt.] |  | 26.4 | 24.3 | 22.5 | 23.8 | 20.76 | 17.89 | 22.9 |
| di [% by wt.] |  | 5.87 | 4.32 | 2.0 | 4.53 | 3.01 | 1.2 | 6.4 |
| poly [% by wt.] |  | 0.48 | 0.38 | 0.2 | 0.34 | 0.17 | 0 | 0.2 |
| n-Paraffin content [% by wt.] |  | 23.2 | 24.3 | 26.5 | 23.7 | 26.3 | 22.5 | 23.5 |

TABLE 2A

Characterization of the amide-ammonium salts (A) used

| A1 | Reaction product of a copolymer of $C_{14}/C_{16}$-α-olefin and maleic anhydride with 2 equivalents of hydrogenated ditallowamine |
|---|---|
| A2 | Reaction product of ethylenediaminetetraacetic acid with 4 equivalents of ditallowamine to give the amide-ammonium salt |
| A3 | Reaction product of phthalic anhydride and 2 equivalents of di(hydrogenated tallow)amine |

TABLE 2B

Characterization of the oil-soluble amines (B) used

| B1 | Di(tallowamine) |
|---|---|
| B2 | Di(stearylamine) |
| B3 | Tallowamine |
| B4 | Dimethyllaurylamine |
| B5 | Dimethyltetradecylamine |
| B6 | Tallowpropylenediamine |
| B7 | Dimethylhexadecylamine |
| B8 | Dimethylcocoamine |
| B9 | Triethylenetetramine |

TABLE 2C

Characterization of the lubricity additives (C) used

| C1 | Tall oil fatty acid |
|---|---|
| C2 | $C_{18}$-Alkenylsuccinic acid bis(ethylene glycol ester) |
| C3 | Oleic acid diethanolamide |
| C4 | Oleic acid |

TABLE 2D

Characterization of the further cold flow improvers used D)-(G)

| D1 | Nonylphenol-formaldehyde resin, $M_w$ = 4500 g/mol, 60% in higher-boiling aromatic solvent |
|---|---|
| D2 | Dodecyl benzoate-formaldehyde resin, $M_w$ = 2100 g/mol, 50% in higher-boiling aromatic solvent |
| E1 | Behenic ester of alkoxylated glycerol, $M_p$ = 3100 g/mol; 50% in higher-boiling aromatic solvent |
| E2 | PEG 400-dibehenate, 50% in higher-boiling aromatic solvent |
| F1 | Copolymer of ditetradecyl fumarate, 50% in higher-boiling aromatic solvent |
| F2 | Poly(C12/14-alkyl acrylate), $M_w$ = 85 000 g/mol, 50% in higher-boiling aromatic solvent |
| G1 | Copolymer of ethylene and 13.5 mol % of vinyl acetate having a melt viscosity $V_{140}$ measured at 140° C. of 125 mPas, 65% in kerosene. Density (40° C.) = 0.85 g/cm$^3$ |
| G2 | Terpolymer of ethylene, 13 mol % of vinyl acetate and 2 mol % of vinyl neodecanoate having a melt viscosity $V_{140}$ measured at 140° C. of 95 mPas, 65% in kerosene. Density (40° C.) = 0.86 g/cm$^3$ |
| G3 | Mixture of equal parts G1 and G2 |
| G4 | Terpolymer of ethylene, 13 mol % of vinyl acetate and 5 mol % of propylene having a melt viscosity $V_{140}$ measured at 140° C. of 110 mPas, 65% in kerosene. Density (40° C.) = 0.87 g/cm$^3$ |

Both the amide-ammonium salts (A) and the oil-soluble amines (B) were used in the form of 60% concentrates in a high-boiling aromatic solvent mixture for the purpose of easier handling. Lubricity additives (C) were used without prior dilution. The dosage rates specified in tables 3-9 are based on the amount of active ingredient added in each case.

TABLE 3

Suppression of the antagonism caused by lubricity additives in respect of the CFPP value by amines in test oil 1

| Ex. | A1 [ppm] | B1 [ppm] | B1 [% by wt.] | C1 [ppm] | CFPP [° C.] |
|---|---|---|---|---|---|
| 1 (comp.) | 24 | — | — | — | −29 |
| 2 (comp.) | 24 | 4 | 17 | — | −29 |
| 3 (comp.) | 24 | 10 | 42 | — | −29 |
| 4 (comp.) | 24 | 20 | 83 | — | −29 |
| 5 (comp.) | 24 | — | — | 200 | −24 |
| 6 | 24 | 4 | 17 | 200 | −26 |
| 7 | 24 | 10 | 42 | 200 | −28 |
| 8 | 24 | 20 | 83 | 200 | −29 |
| 9 (comp.) | 24 | — | — | 350 | −22 |
| 10 | 24 | 4 | 17 | 350 | −24 |
| 11 | 24 | 10 | 42 | 350 | −26 |
| 12 | 24 | 20 | 83 | 350 | −29 |

As a further flow improver, the test oil contained 260 ppm by volume of a mixture of 1 part by weight of D1 and 6 parts by weight of G4 (CFI 1; density@40° C.=0.91 g/cm³).

TABLE 4

Suppression of the antagonism caused by lubricity additives in respect of paraffin dispersancy by amines in test oil 2

| Ex. | A [ppm] | B [% by wt.; ppm] | C1 [ppm] | vis | Sediment % by vol. | Cloud point [° C.] before | top | bottom | ΔCP$_o$ [° C.] | ΔCP$_u$ [° C.] | CFPP [° C.] before | top | bottom | ΔCFPP$_o$ [° C.] | ΔCFPP$_u$ [° C.] | PASS |
|---|---|---|---|---|---|---|---|---|---|---|---|---|---|---|---|---|
| 0(C) | A1 [54] | — | — | d | 0 | −16.7 | −16.9 | −16.4 | 0.2 | 0.3 | −38 | −37 | −37 | 1.0 | 1.0 | + |
| 1(C) | A1 [54] | — | 350 | s | 8 | −16.5 | −18.5 | −12.5 | 2.0 | 4.0 | −33 | −34 | −25 | 1.0 | 8.0 | − |
| 2 | A1 [54] | B1 [31; 17] | 350 | d | 0 | −16.7 | −16.4 | −16.7 | 0.3 | 0.0 | −37 | −35 | −35 | 2.0 | 2.0 | + |
| 3 | A1 [54] | B2 [31; 17] | 350 | d | <1 | −16.4 | −17.0 | −15.3 | 0.6 | 1.1 | −36 | −38 | −37 | 2.0 | 1.0 | + |
| 4 | A1 [54] | B4 [31; 17] | 350 | d | 0 | −16.3 | −16.8 | −15.6 | 0.5 | 0.7 | −35 | −35 | −34 | 0.0 | 1.0 | + |
| 5 | A1 [54] | B9 [31; 17] | 350 | d | 2 | −16.2 | −17.7 | −14.5 | 1.5 | 1.7 | −33 | −35 | −31 | 2.0 | 2.0 | + |
| 6 | A1 [72] | — | — | d | 0 | −16.7 | −16.9 | −16.4 | 0.2 | 0.3 | 36 | −36 | −35 | 0.0 | 1.0 | − |
| 7 | A1 [72] | — | 350 | d | 0 | −16.5 | −18.9 | −14.1 | 2.4 | 2.1 | −34 | −34 | −21 | 0.0 | 13.0 | − |
| 8 | A2 [72] | — | 350 | d | 0 | −16.6 | −18.6 | −15.3 | 2.0 | 1.3 | −34 | −36 | −28 | 2.0 | 6.0 | − |
| 9 | A3 [72] | — | 350 | d | 2 | −16.2 | −16.4 | −14.1 | 0.2 | 2.1 | −33 | −33 | −28 | 0.0 | 5.0 | − |
| 10 | A2 [72] | B1 [21; 15] | 350 | d | 0 | −16.5 | −16.6 | −16.3 | 0.1 | 0.3 | −35 | −35 | −34 | 0.0 | 1.0 | + |
| 11 | A3 [72] | B1 [21; 15] | 350 | d | <1 | −16.3 | −16.4 | −15.6 | 0.1 | 0.7 | −35 | −34 | −33 | 1.0 | 2.0 | + |

As a further flow improver, the test oil contained 210 ppm by volume of a mixture of 3.5 parts by weight of D1, 1 part by weight of E2 and 17 parts by weight of G3 (CFI 1; density@40° C.=0.90 g/cm³). The storage temperature was −22° C. and the storage time 16 h.

TABLE 5

Suppression of the antagonism caused by lubricity additives in respect of the CFPP value by amines in test oil 3

| Ex. | A [ppm] | B [ppm] | B % by wt. | C [ppm] | CFPP [° C.] |
|---|---|---|---|---|---|
| 1 (comp.) | A1 [24] | — | — | — | −27 |
| 2 (comp.) | A1 [24] | B2 [7.5] | B2 [31] | — | −27 |
| 3 (comp.) | A1 [24] | B4 [7.5] | B4 [31] | — | −26 |
| 4 (comp.) | A1 [24] | B5 [7.5] | B5 [31] | — | −27 |
| 5 (comp.) | A1 [24] | B6 [7.5] | B6 [31] | — | −28 |
| 6 (comp.) | A1 [24] | B7 [7.5] | B7 [31] | — | −27 |
| 7 (comp.) | A1 [24] | B8 [7.5] | B8 [31] | — | −27 |
| 8 (comp.) | A1 [24] | — | — | C1 [200] | −13 |
| 9 | A1 [24] | B2 [7.5] | B2 [31] | C1 [200] | −27 |
| 10 | A1 [24] | B4 [7.5] | B4 [31] | C1 [200] | −26 |
| 11 | A1 [24] | B5 [7.5] | B5 [31] | C1 [200] | −27 |
| 12 | A1 [24] | B6 [7.5] | B6 [31] | C1 [200] | −27 |
| 13 | A1 [24] | B7 [7.5] | B7 [31] | C1 [200] | −26 |
| 14 | A1 [24] | B8 [7.5] | B8 [31] | C1 [200] | −26 |
| 15 (comp.) | A1 [24] | — | — | C1 [350] | −15 |
| 16 | A1 [24] | B1 [7.5] | B1 [31] | C1 [350] | −27 |
| 17 | A1 [24] | B5 [7.5] | B4 [31] | C1 [350] | −27 |
| 18 | A1 [24] | B6 [7.5] | B5 [31] | C1 [350] | −27 |
| 19 | A1 [24] | B4 [7.5] | B6 [31] | C1 [350] | −26 |
| 20 | A1 [24] | B7 [7.5] | B7 [31] | C1 [350] | −27 |
| 21 | A1 [24] | B8 [7.5] | B8 [31] | C1 [350] | −26 |

As a flow improver, the test oil contained 260 ppm by volume of a mixture of 3.5 parts by weight of D1, 1 part by weight of E1and 15 parts by weight of G2 (CFI 3; density@40° C.=0.91 g/cm³).

TABLE 6

Suppression of the antagonism caused by lubricity additives in respect of the CFPP value by amines in test oil 4

| Ex. | A [ppm] | B [ppm] | B [% by wt.] | C [ppm] | CFI 4 [ppm by vol.] | CFPP [° C.] |
|---|---|---|---|---|---|---|
| 1 (comp.) | A1 [30] | — | — | — | 250 | −27 |
| 2 (comp.) | A1 [36] | — | — | — | 300 | −27 |
| 3 (comp.) | A1 [30] | B2 [9] | B2 [31] | — | 250 | −27 |
| 4 (comp.) | A1 [30] | B8 [9] | B8 [31] | — | 250 | −27 |
| 5 (comp.) | A1 [30] | — | — | C1 [200] | 250 | −23 |
| 6 (comp.) | A1 [36] | — | — | C1 [200] | 300 | −23 |
| 7 | A1 [30] | B2 [9] | B2 [31] | C1 [200] | 250 | −27 |
| 8 | A1 [30] | B8 [9] | B8 [31] | C1 [200] | 250 | −26 |
| 9 (comp.) | A1 [30] | — | — | C1 [350] | 250 | −22 |
| 10 (comp.) | A1 [36] | — | — | C1 [350] | 300 | −22 |
| 11 | A1 [30] | B2 [9] | B2 [31] | C1 [350] | 250 | −27 |
| 12 | A1 [30] | B8 [9] | B8 [31] | C1 [350] | 250 | −28 |

As a further flow improver, a mixture of 3.5 parts by weight of D1, 1 part by weight of E1and 17 parts by weight of G4 (CFI 4; density@40° C.=0.91 g/cm³) was added to the test oil.

TABLE 7

Suppression of the antagonism caused by lubricity additives in respect of paraffin dispersancy by amines in test oil 5

| | | B | | Sediment | | Cloud point [° C.] | | | ΔCP$_o$ | ΔCP$_u$ | CFPP [° C.] | | | ΔCFPP$_o$ | ΔCFPP$_u$ | |
|---|---|---|---|---|---|---|---|---|---|---|---|---|---|---|---|---|
| | A | [% by wt.; | C | | % by | | | | | | | | | | | |
| Ex. | [ppm] | ppm] | [ppm] | vis | vol. | before | top | bottom | [° C.] | [° C.] | before | top | bottom | [° C.] | [° C.] | PASS |
| 0(C) | A1 [36] | — | — | d | 0 | −7.9 | −8.1 | −7.6 | 0.2 | 0.3 | −25 | −26 | −25 | 1.0 | 0.0 | + |
| 1(C) | A1 [36] | — | C1 [350] | s | 4 | −7.7 | −9.3 | −5.5 | 1.6 | 2.2 | −22 | −22 | −18 | 0.0 | 4.0 | − |
| 2(C) | A1 [36] | — | C2 [350] | s | 9 | −7.9 | −9.5 | −5.3 | 1.6 | 2.6 | −23 | −22 | −18 | 1.0 | 5.0 | − |
| 3(C) | A1 [36] | — | C3 [350] | s | 7 | −7.8 | −9.6 | −5.5 | 1.8 | 2.3 | −22 | −21 | −18 | 1.0 | 4.0 | − |
| 4 | A1 [36] | B1 [31; 9] | C1 [350] | d | 0 | −7.9 | −7.9 | −7.6 | 0.0 | 0.3 | −26 | −25 | −25 | 1.0 | 1.0 | + |
| 5 | A1 [36] | B1 [31; 9] | C2 [350] | d | >1 | −7.8 | −7.9 | −7.5 | 0.1 | 0.3 | −25 | −25 | −24 | 0.0 | 1.0 | + |
| 6 | A1 [36] | B1 [31; 9] | C3 [350] | d | 0 | −7.7 | −7.9 | −7.6 | 0.2 | 0.1 | −25 | −26 | −24 | 1.0 | 1.0 | + |
| 7 | A2 [36] | B8 [31; 9] | C1 [350] | d | <1 | −7.8 | −8.1 | −7.5 | 0.3 | 0.3 | −26 | −25 | −25 | 1.0 | 1.0 | + |
| 8 | A2 [36] | B8 [31; 9] | C2 [350] | d | 0 | −7.7 | −8.2 | −7.3 | 0.5 | 0.4 | −25 | −26 | 24 | 1.0 | 1.0 | + |
| 9 | A2 [36] | B8 [31; 9] | C3 [350] | d | 2 | −7.8 | −8.2 | −7.5 | 0.4 | 0.3 | −26 | −24 | −24 | 2.0 | 2.0 | + |

As a further flow improver, the test oil contained 280 ppm by volume of a mixture of 4.0 parts by weight of G1, 1 part by weight of D1, 0.5 parts by weight of F1 and 1 part by weight of E1(CFI 5; density@40° C.=0.90 g/cm$^3$). The storage temperature was −18° C., the storage time 24 h.

TABLE 8

Suppression of the antagonism caused by lubricity additives in respect of paraffin dispersancy by amines in test oil 6

| | | B | | Sediment | | Cloud point [° C.] | | | ΔCP$_o$ | ΔCP$_u$ | CFPP [° C.] | | | ΔCFPP$_o$ | ΔCFPP$_u$ | |
|---|---|---|---|---|---|---|---|---|---|---|---|---|---|---|---|---|
| | A | [% by wt ; | C | | % by | | | | | | | | | | | |
| Ex. | [ppm] | ppm] | [ppm] | vis. | vol. | before | top | bottom | [° C.] | [° C.] | before | top | bottom | [° C.] | [° C.] | PASS |
| 0(C) | A1 [48] | — | — | d | 0 | −8.0 | −7.6 | −8.2 | 0.4 | 0.2 | −25 | −26 | −25 | 1 | 0 | + |
| 1(C) | A1 [48] | — | C1 [300] | s | 8 | −7.7 | −5.1 | −5.3 | 2.6 | 2.4 | −21 | −23 | −18 | 4 | 3 | − |
| 2(C) | A1 [48] | — | C2 [300] | s | 9 | −7.6 | −5.2 | −3.5 | 2.4 | 4.1 | −20 | −22 | −17 | 2 | 3 | − |
| 3(C) | A1 [48] | — | C3 [300] | s | 7 | −7.5 | −4.4 | −1.8 | 3.1 | 5.8 | −22 | −18 | −16 | 4 | 6 | − |
| 4(C) | A1 [48] | — | C4 [300] | s | 10 | −7.9 | −5.2 | −4.8 | 2.7 | 3.1 | −23 | −20 | −21 | 3 | 1 | − |
| 5 | A1 [48] | B1 [50; 24] | C1 [300] | d | 0 | −7.9 | −8.0 | −7.9 | 0.1 | 0.0 | −25 | −24 | −26 | 1 | 1 | + |
| 6 | A1 [48] | B1 [50; 24] | C2 [300] | d | >1 | −8.0 | −8.3 | −7.4 | 0.7 | 0.6 | −26 | −26 | −25 | 0 | 1 | + |
| 7 | A1 [48] | B1 [50; 24] | C3 [300] | d | 0 | −7.8 | −8.1 | −8.0 | 0.3 | 0.2 | −27 | −26 | −27 | 1 | 0 | + |
| 8 | A1 [48] | B1 [50; 24] | C4 [300] | d | 1 | −7.9 | −8.1 | −7.5 | 0.2 | 0.4 | −26 | −25 | −26 | 1 | 0 | + |
| 9 | A1 [48] | B3 [50; 24] | C4 [300] | d | 1 | −8.0 | −8.5 | −7.3 | 0.5 | 0.7 | −25 | −25 | −24 | 0 | 1 | + |

As a further flow improver, the test oil contained 320 ppm of a mixture of 3.5 parts by weight of G3, 1 part by weight of D2, 1 part by weight of F2 and 1 part by weight of E1(CFI 6; density@40° C.=0.90 g/cm$^3$). The storage temperature was −18° C. and the storage time 24 h.

TABLE 9

Suppression of the antagonism caused by lubricity additives in respect of the CFPP value by amines and resins in test oil 7

| | A [ppm] | B [% by wt.; ppm] | C [ppm] | D [ppm] | CFI 7 [ppm by vol.] | CFPP [° C.] |
|---|---|---|---|---|---|---|
| 1 (C) | A1 [48] | — | — | — | 230 | −20 |
| 2 (C) | A1 [48] | — | — | D1 [50] | 230 | −23 |
| 3 (C) | A1 [48] | — | C1 [300] | — | 230 | −15 |
| 4 | A1 [48] | — | C1 [300] | D1 [50] | 230 | −18 |
| 5 | A1 [48] | B1 [50; 24] | C1 [300] | — | 230 | −19 |
| 6 | A1 [48] | B1 [50; 24] | C1 [300] | D1 [50] | 230 | −24 |
| 7(C) | A2 [48] | — | — | — | 230 | −19 |
| 8(C) | A2 [48] | — | — | D2 [50] | 230 | −22 |
| 9 (C) | A2 [48] | — | C2 [300] | — | 230 | −15 |
| 10 | A2 [48] | — | C2 [300] | D2 [50] | 230 | −17 |
| 11 | A2 [48] | B1 [50; 24] | C2 [300] | — | 230 | −19 |
| 12 | A2 [48] | B1 [50; 24] | C2 [300] | D2 [50] | 230 | −22 |

As a further flow improver, the test oil contained a mixture of 1.5 parts by weight of E1 and 17 parts by weight of G4 (CFI 7; density@40° C.=0.90 g/cm$^3$).

The experiments in table 9 show that the antagonistic effect caused by the lubricity additive (C) on the improvement in low-temperature properties achieved by the amide-ammonium salt (A) in combination with the further flow improvers can be counteracted both by addition of an amine (A) and by addition of a resin (D). Only by addition of amine (A) and resin (D) can the antagonistic effect be overcome.

The invention claimed is:

1. A method of improving the low-temperature properties of a fuel oil having a sulfur content of less than 50 ppm, and comprising a lubricity additive (C), wherein the method comprises the step of adding a low-temperature additive to the fuel oil, the low-temperature additive comprising
  i) at least one oil-soluble amide-ammonium salt of a polycarboxylic acid with a mono- and/or dialkylamine (A),
  ii) 5-100% by weight, based on the amount of amide-ammonium salt (A), of an oil-soluble amine (B), and
  iii) 0.1 to 10 parts by weight, based on the amount of amide-ammonium salt (A), of a resin formed from at least one aromatic compound bearing an alkyl radical and an aldehyde and/or ketone (D),
  wherein the fuel oil contains between 50 and 1000 ppm of a lubricity additive (C) selected from the group consisting of fatty acids, oligomers of unsaturated fatty acids, alk(en)ylsuccinic acids, partial esters of polyols with fatty acids, oligomers of unsaturated fatty acids, alk(en)ylsuccinic acids, fatty acid amides of alkanolamines and mixtures thereof.

2. The method as claimed in claim 1, in which the lubricity additive (C) is a fatty acid.

3. The method as claimed in claim 1, wherein the polycarboxylic acid is selected from the group consisting of monomeric dicarboxylic acids, monomeric polycarboxylic acids and copolymerized dicarboxylic acids.

4. The method as claimed in claim 1, wherein the low-temperature additive contains 1% to 95% by weight of amide-ammonium salt (A).

5. The method as claimed in claim 1, in which the oil-soluble amine (B) has the formula (1)

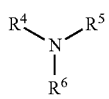

in which
  $R^4$ is an alkyl radical having 8 to 22 carbon atoms or a group of the formula $-(CH_2)_n-[NR^7-(CH_2)_n]_m-NH_2$,
  $R^5$ is hydrogen, an alkyl radical having 1 to 22 carbon atoms or a group of the formula $-(CH_2)_n-[NR^7-(CH_2)_n]_m-NH_2$,
  $R^6$ is hydrogen or an alkyl radical having 1 to 22 carbon atoms,
  $R^7$ is hydrogen or an alkyl radical having 1 to 22 carbon atoms,
  n is 2 or 3 and
  m is 0 to 10.

6. The method as claimed in claim 1, wherein the low-temperature additive contains 15% to 70% by weight of oil-soluble amine (B) based on the amount of amide-ammonium salt (A).

7. The method as claimed in claim 1, wherein the oil-soluble amine (B) is a primary, secondary or tertiary fatty amine.

8. The method as claimed in claim 5, in which, in formula (1),
  $R^4$ is an alkyl radical having 8 to 22 carbon atoms,
  $R^5$ is hydrogen or an alkyl radical having 1 to 22 carbon atoms and
  $R^6$ is hydrogen or an alkyl radical having 1 to 22 carbon atoms.

9. The method as claimed in claim 1, wherein the oil-soluble amine (B) has at least one alkyl radical having 10 to 22 carbon atoms.

10. The method as claimed in claim 1, wherein the oil-soluble amine (B) is a polyamine.

11. The method as claimed in claim 1, wherein constituent iii) is an alkylphenol resin or a hydroxybenzoate resin.

12. The method as claimed in claim 1, wherein the low-temperature additive additionally comprises a polyoxyalkylene compound (E).

13. The method as claimed in claim 1, wherein the low-temperature additive additionally comprises a comb polymer (F).

14. The method as claimed in claim 1, wherein the low-temperature additive additionally comprises an ethylene copolymer (G).

15. A fuel oil having a sulfur content of less than 50 ppm, comprising a lubricity additive (C) and a low-temperature additive, the low-temperature additive comprising
  i) at least one oil-soluble amide-ammonium salt of a polycarboxylic acid with a mono- and/or dialkylamine (A),
  ii) 5-100% by weight, based on the amount of amide-ammonium salt (A), of an oil-soluble amine (B), and
  iii) 0.1 to 10 parts by weight, based on the amount of amide-ammonium salt (A), of a resin formed from at least one aromatic compound bearing an alkyl radical and an aldehyde and/or ketone (D), wherein the lubricity additive (C) is selected from the group consisting of fatty acids, oligomers of unsaturated fatty acids, alk(en)ylsuccinic acids, partial esters of polyols with fatty acids, oligomers of unsaturated fatty acids and/or alk(en)ylsuccinic acids, fatty acid amides of alkanolamines, and mixtures thereof.

16. The fuel oil as claimed in claim 15, in which the sulfur content of the fuel is less than 20 ppm.

17. The fuel oil as claimed in claim 15, wherein the fuel oil contains 50 to 1500 ppm (m/m) of the low-temperature additive (A).

18. The fuel oil as claimed in claim 15, wherein the fuel oil is of mineral origin.

19. The fuel oil as claimed in claim 15, wherein the fuel oil comprises synthetic fuel.

20. The fuel oil as claimed in claim 15, wherein the fuel oil is a middle distillate.

21. The fuel oil as claimed in claim 15, wherein the fuel oil is diesel oil or heating oil.

22. The fuel oil as claimed in claim 15, wherein the polycarboxylic acid is selected from the group consisting of monomeric dicarboxylic acids, monomeric polycarboxylic acids and copolymerized dicarboxylic acids.

23. The fuel oil as claimed in claim 15, wherein the low temperature additive contains 1% to 95% by weight of amide-ammonium salt (A).

24. The fuel oil as claimed in claim 15, in which the oil-soluble amine (B) has the formula (1)

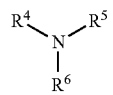

in which
  $R^4$ is an alkyl radical having 8 to 22 carbon atoms or a group of the formula $-(CH_2)_n-[NR^7-(CH_2)_n]_m-NH_2$, R⁵ is hydrogen, an alkyl radical having 1 to 22 carbon atoms or a group of the formula —$(CH_2)_n$—[$NR^7$—$(CH_2)_n]_m$—$NH_2$, R⁶ is hydrogen or an alkyl radical having 1 to 22 carbon atoms, R⁷ is hydrogen or an alkyl radical having 1 to 22 carbon atoms, n is 2 or 3 and m is 0 to 10.

25. The fuel oil as claimed in claim 15, wherein the low-temperature additive contains 15% to 70% by weight of oil-soluble amine (B) based on the amount of amide-ammonium (A).

26. The fuel oil as claimed in claim 15, wherein the oil-soluble amine (B) is a primary, secondary or tertiary fatty amine.

27. The fuel oil as claimed in claim 24, in which, in formula (1),

R⁴ is an alkyl radical having 8 to 22 carbon atoms,

R⁵ is hydrogen or an alkyl radical having 1 to 22 carbon atoms and

R⁶ is hydrogen or an alkyl radical having 1 to 22 carbon atoms.

28. The fuel oil as claimed in claim 15, wherein the oil-soluble amine (B) has at least one alkyl radical having 10 to 22 carbon atoms.

29. The fuel oil as claimed in claim 15, wherein the oil-soluble amine (B) is a polyamine.

30. The fuel oil as claimed in claim 15, wherein constituent iii) is an alkylphenol resin or a hydroxybenzoate resin.

31. The fuel oil as claimed in claim 15, wherein the low-temperature additive additionally comprises a polyoxyalkylene compound (E).

32. The fuel oil as claimed in claim 15, wherein the low-temperature additive additionally comprises a comb polymer (F).

33. The fuel oil as claimed in claim 15, wherein the low-temperature additive additionally comprises an ethylene copolymer (G).

* * * * *